United States Patent [19]

Orii et al.

[11] Patent Number: 5,309,942
[45] Date of Patent: May 10, 1994

[54] TIMER UNIT FOR CONTROLLING VALVES

[75] Inventors: Makoto Orii; Hiroyuki Iwasita, both of Suwa, Japan

[73] Assignee: Sankyo Seiki Mfg. Co., Ltd., Japan

[21] Appl. No.: 968,045

[22] Filed: Oct. 28, 1992

[30] Foreign Application Priority Data

Nov. 1, 1991 [JP] Japan .................. 3-288091

[51] Int. Cl.$^5$ .................. G05B 19/06; F16K 31/48
[52] U.S. Cl. .................. 137/624.18; 137/624.11; 137/624.2
[58] Field of Search .................. 137/624.11, 624.18, 137/624.2

[56] References Cited

U.S. PATENT DOCUMENTS

| | | | |
|---|---|---|---|
| 2,098,815 | 11/1937 | Van Veen | 137/624.11 |
| 2,772,067 | 11/1956 | Wilson | 137/624.11 X |
| 2,995,150 | 8/1961 | Engholdt | 137/624.11 |
| 3,074,204 | 1/1963 | Tatone | 137/624.11 X |
| 4,022,239 | 5/1977 | Schwindt et al. | 137/624.2 X |
| 4,180,099 | 12/1979 | Moore | 137/624.11 X |

Primary Examiner—Gerald A. Michalsky
Attorney, Agent, or Firm—McAulay Fisher Nissen Goldberg & Kiel

[57] ABSTRACT

An inexpensive timer unit which can operate stably in the event of a power failure. The timer unit acts to switch the operation times of two valve mechanisms for opening and closing fluid passages. The unit comprises a rotatable windup shaft, a torsion coil spring, an eddy-current-generating governor mechanism, and two cams. Energy is stored in the spring by rotating the windup shift through a given angle so as to tighten the spring. The speed of rotation of the windup shaft when the tightened spring is released is adjusted by the governor mechanism. At this time, the rotation of the windup shaft is transmitted to the cams. The profiles of the cams are determined according to the operation times of the valve mechanisms.

3 Claims, 20 Drawings Sheets

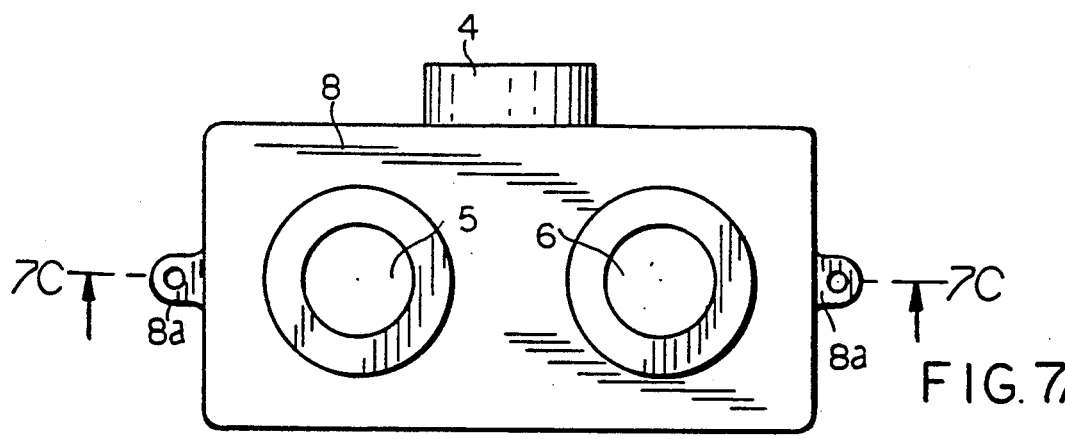
FIG. 7A
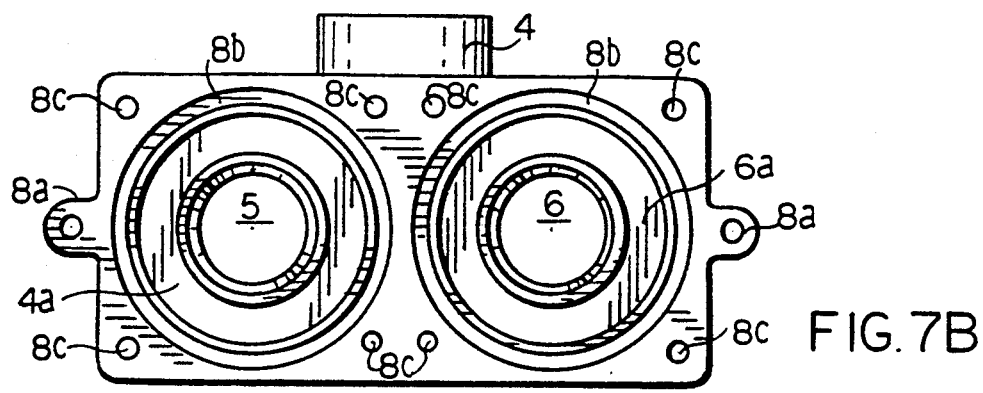
FIG. 7B
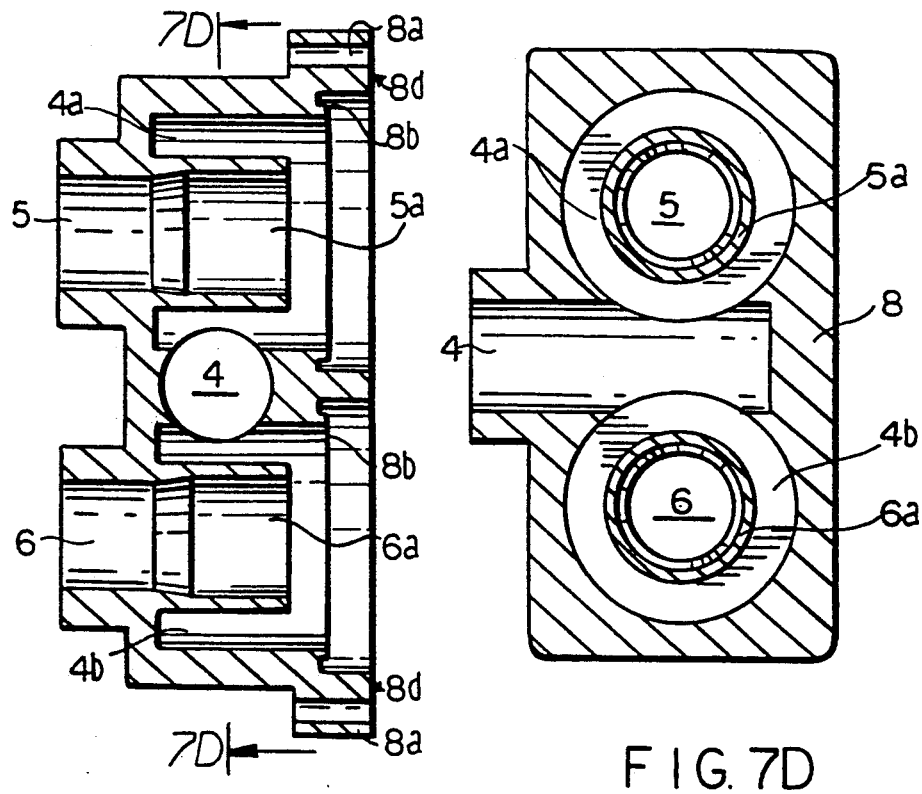
FIG. 7C
FIG. 7D

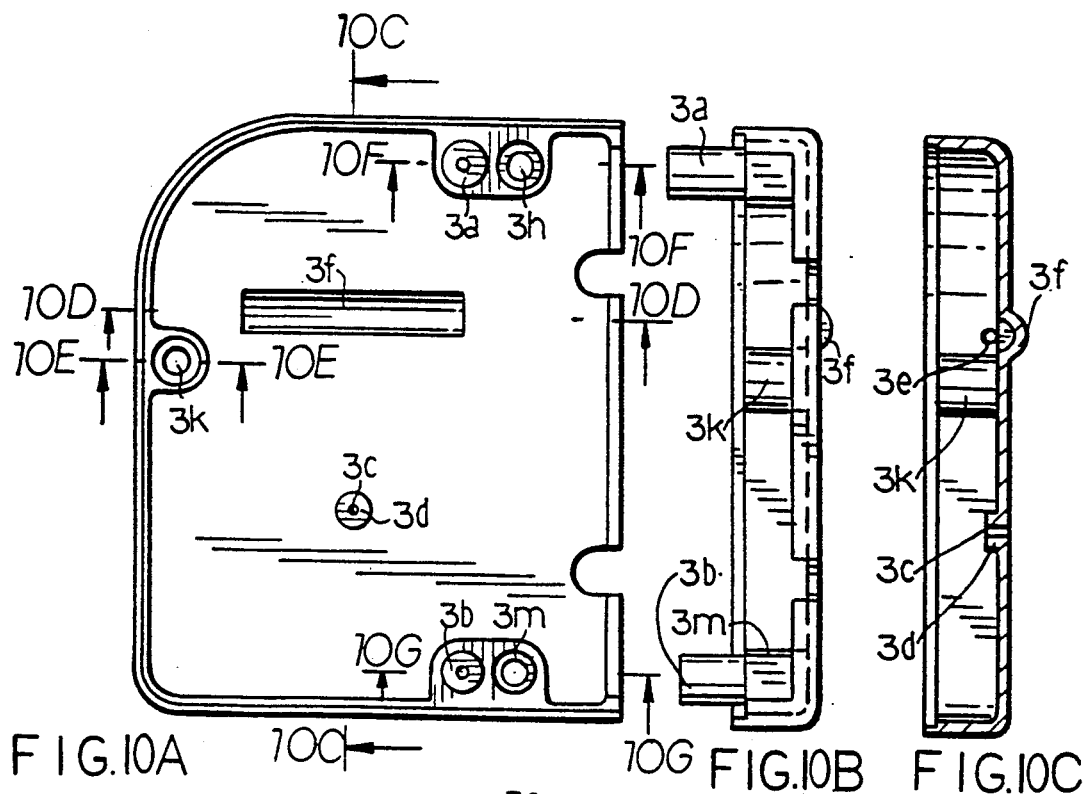
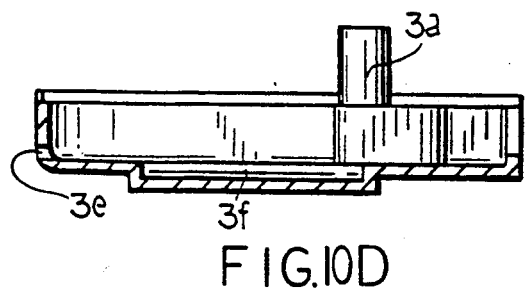 
FIG.10D  FIG.10E
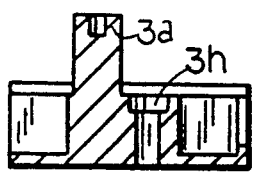 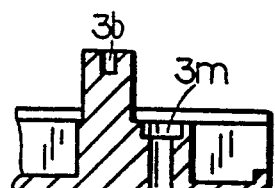
FIG.10F  FIG.10G
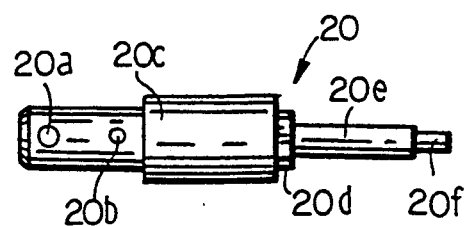 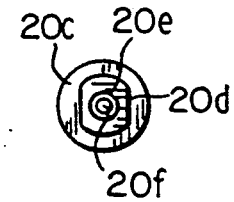
FIG.11A  FIG.11B

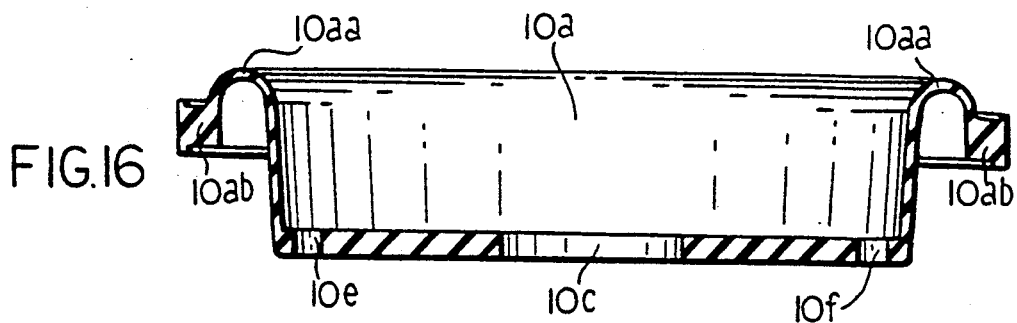
FIG.16
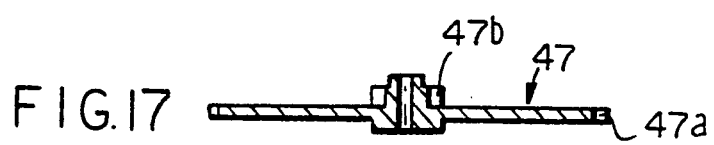
FIG.17
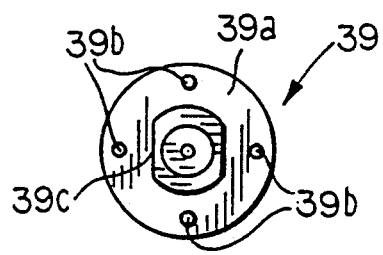
FIG.18A
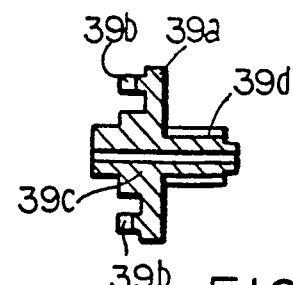
FIG.18B
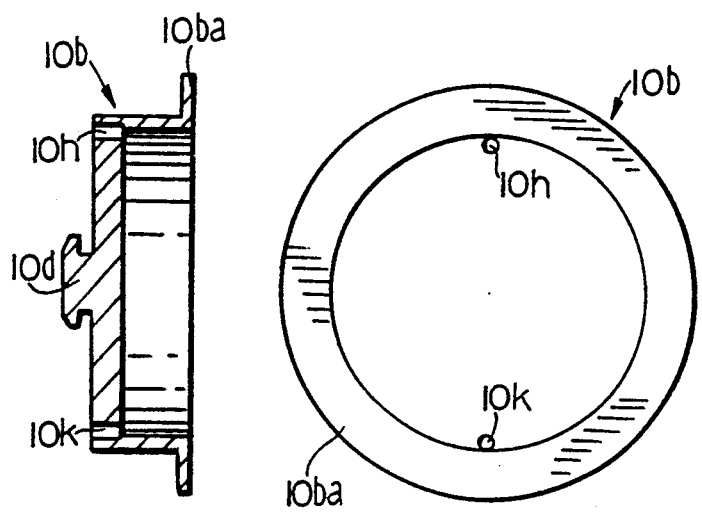
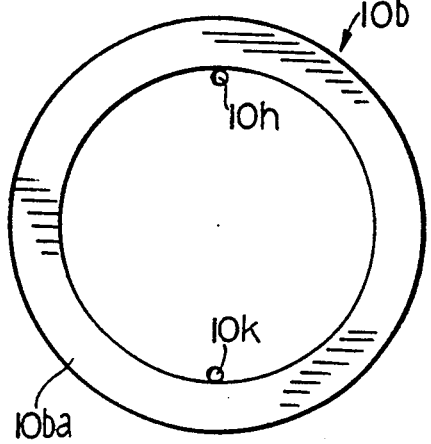
FIG.19B  FIG.19A

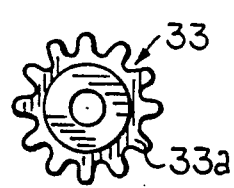
FIG. 20A
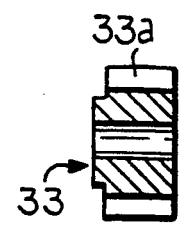
FIG. 20B
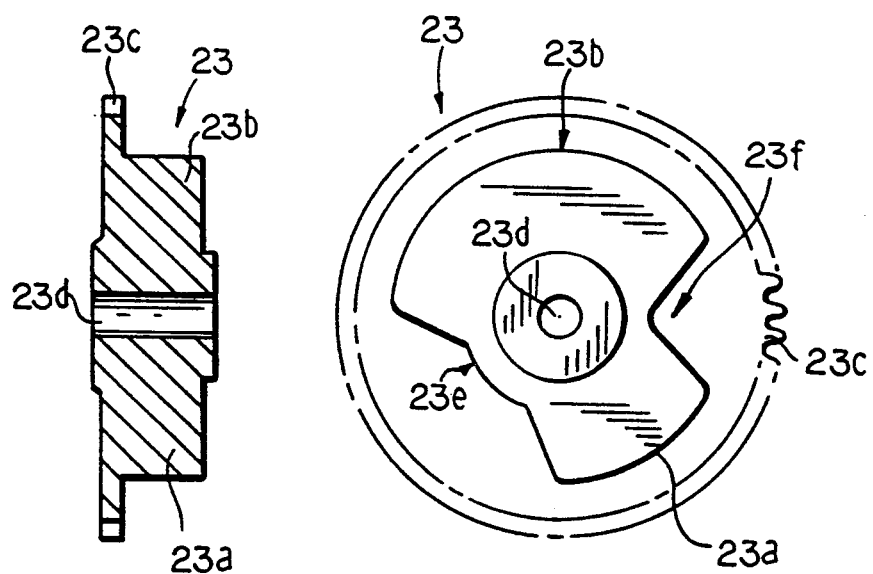
FIG. 21B
FIG. 21A

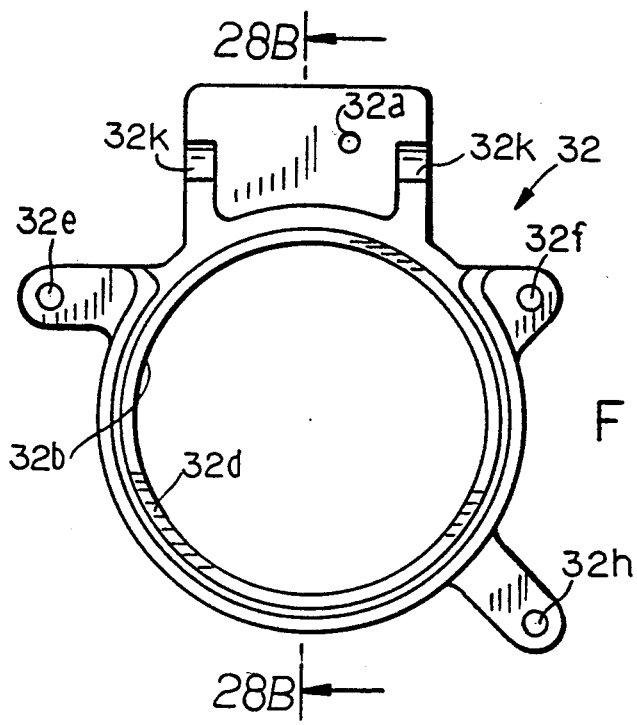
FIG. 28A
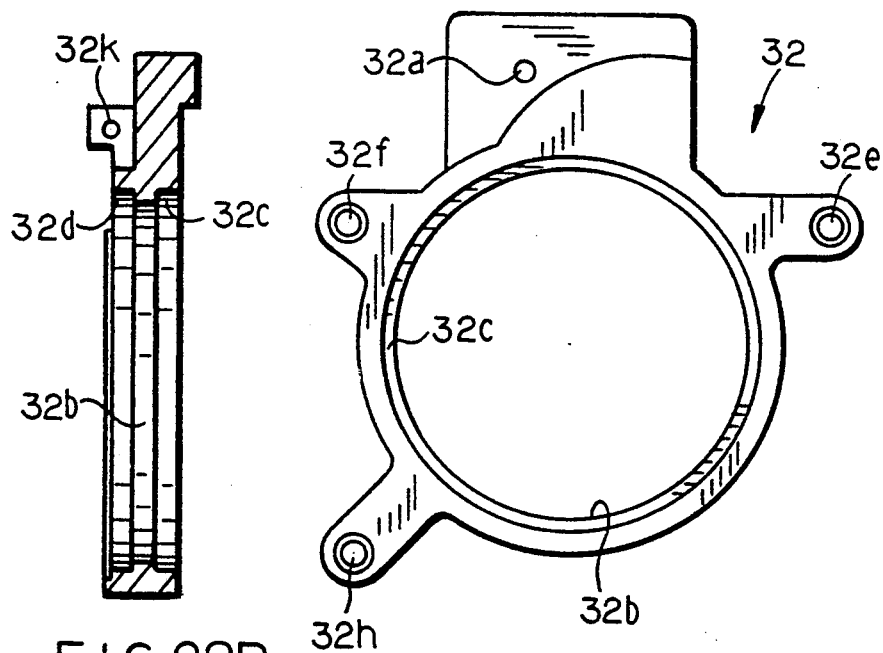
FIG. 28B
FIG. 28C

TIMER UNIT FOR CONTROLLING VALVES

BACKGROUND OF THE INVENTION a) Field of the Invention

The present invention relates to a timer unit for mechanically controlling the operation times of valves, respectively, which act to switch the condition of fluid passages.

b) Background Art

A toilet bowl equipped with a flushing device is required to store water in its flush tank and also in its cleaning warmed water tank. The amount of water stored in the flush tank differs from the amount of water stored in the cleaning water tank. Tap water supplied from a single tap is guided into the two tanks by controlling the operation times of valves, or the times for which their respective valves are opened, according to the capacities of the tanks. The valves are mounted between the tap and their respective tanks.

An electrical timer unit is incorporated in each valve mechanism mounted in the fluid passage extending from the tap to each tank to control the valve mechanism. A different time is set into each timer unit. In particular, the valve for a flush tank requiring a large amount of water is set up so that it is opened for a long time. The valve for a cleaning warmed water tank requiring a relatively small amount of water is set up so that it is opened for a short time.

In this way, electrical timer units are known which control their respective valves in such a manner that liquid supplied from a single liquid supply port is divided into two dissimilar amounts of liquid discharged from plural delivery ports. All of these electrical timer units are equipped with a control printed board.

Where a valve is opened and closed under the control of an electrical timer unit, the timer fails to operate in the event of a power failure. For example, where valves in a flush toilet are controlled by electrical timer units, supply of water to the tanks is impossible in the event of a power failure. This is a fatal problem with the flush toilet. To make preparations for a power failure, it is necessary to provide a manual valve. However, this makes the appliance large and increases the cost.

SUMMARY OF THE INVENTION

Accordingly, it is an object of the present invention to provide an inexpensive valve control timer unit which is free from the foregoing problems of the prior art electrical timer unit.

In accordance with the invention, a timer unit for switching the operation times of plural mechanisms which open and close fluid passages comprises a windup shaft mounted so as to be rotatable, a spring which, when said windup shaft is rotated through a given angle, is wound and tightened so that energy is stored in the spring, speed-adjusting means which adjusts the rotation of the windup shaft when the tightened spring is released, and a plurality of cams to which rotation of the windup shaft driven by the releasing force of the spring is imparted so as to rotate the cams. The cams have profiles corresponding to operation times of the valve mechanisms.

For a better understanding of the present invention, reference is made to the following description and accompanying drawings while the scope of the invention will be pointed out in the appended claims.

BRIEF DESCRIPTION OF THE DRAWINGS

FIG. 7(a) is a front elevation of the cam body shown in FIGS. 3 and 4;

FIG. 7(b) is a rear view of the cam body shown in FIG. 7(a);

FIG. 7(c) is a cross-sectional view taken on line A—A of FIG. 7(a);

FIG. 7(d) is a cross-sectional view taken on line B—B of FIG. 7(c);

FIG. 10(a) is a bottom view of the second case shown in FIG. 1, for showing the inside of the second case;

FIG. 10(b) is a side elevation of the second case shown in FIG. 10(a);

FIG. 10(c) is a cross-sectional view taken on line A—A of FIG. 10(a);

FIG. 10(d) is a cross-sectional view taken on line B—B of FIG. 10(a);

FIG. 10(e) is a cross-sectional view taken on line F—F of FIG. 10(a);

FIG. 10(f) is a cross-sectional view taken on line E—E of FIG. 10(a);

FIG. 10(g) is a cross-sectional view taken on line G—G of FIG. 10(a);

FIG. 11(a) is a side elevation of the windup shaft shown in FIGS. 1 and 2;

FIG. 11(b) is a plan view of the windup shaft shown in FIG. 11(a);

FIG. 16 is a cross-sectional view of the diaphragm of the main valve shown in FIG. 4;

FIG. 17 is a cross-sectional view of the sixth toothed wheel shown in FIG. 5;

FIG. 18(a) is a plan view of the seventh toothed wheel shown in FIG. 5;

FIG. 18(b) is a cross-sectional view of the toothed wheel shown in FIG. 18(a);

FIG. 19(a) is a plan view of the holder for the main valve, the holder being shown in FIG. 4;

FIG. 19(b) is a cross-sectional view of the holder shown in FIG. 19(a);

FIG. 20(a) is a plan view of the second toothed wheel shown in FIG. 5;

FIG. 20(b) is a cross-sectional view of the second toothed wheel shown in FIG. 20(a);

FIG. 21(a) is a plan view of the fourth toothed wheel shown in FIGS. 5 and 6, the wheel having a first cam;

FIG. 21(b) is a cross-sectional view of the fourth toothed wheel shown in FIG. 21(a);

FIG. 28(a) is a plan view of the second middle plate shown in FIG. 1;

FIG. 28(b) is a cross-sectional view taken on line A—A of FIG. 28(a);

FIG. 28(c) is a bottom view of the second middle plate shown in FIG. 28(a);

DETAILED DESCRIPTION OF THE INVENTION

An embodiment of the invention is next described. In this embodiment, valves for distributing water supplied from a single water pipe between the flush tank and the cleaning warmed water tank of a flush toilet equipped with a cleaning device are controlled.

Figure 2:
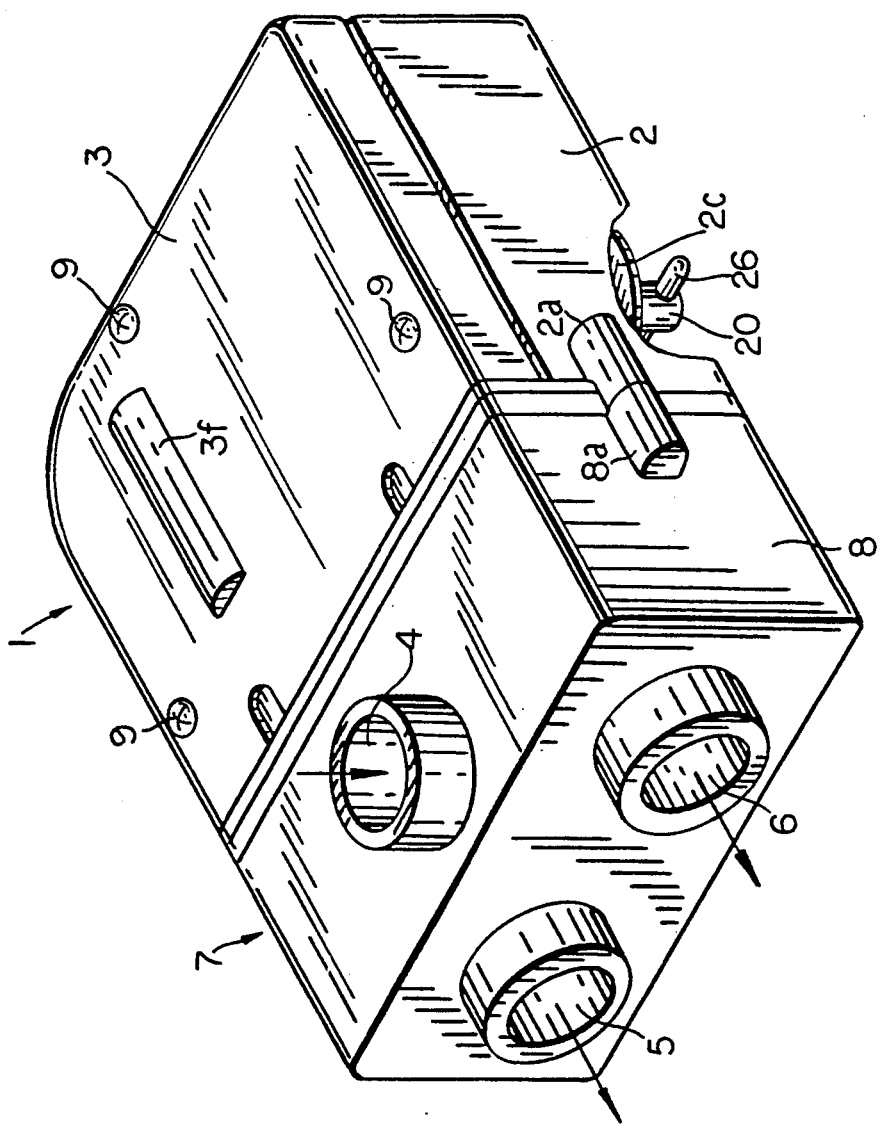
FIG. 2 is a perspective view of a valve in which the timer unit shown in FIG. 1 is mounted.

Referring to FIG. 2, a timer unit 1 for controlling the operation time of a valve is mounted in cases 2 and 3 and connected with a valve mechanism 7 having a single water supply port 4 and plural water delivery ports 5, 6. The water supply port 4 is connected with a water pipe via a pressure-adjusting valve (not shown) to introduce pressure-regulated tap water into a valve body 8. The first delivery port 5 is connected with a flush tank (not shown) which is mounted at the top of the toilet bowl to clean the surface of the bowl from its upper fringe. The second delivery port 6 is connected with a cleaning water tank having a capacity smaller than that of the flush tank. The cleaning water tank is used as a bidet which ejects water from under the water in the toilet bowl.

After accommodating a timer unit (described later), the first case 2 and the second case 3 are made to overlap each other. Then, the two cases are joined together with screws 9. One side surface of the first case 2 has a protruding mounting portion 2a. Similarly, one side surface of the valve body 8 has a protruding mounting portion 8a. These mounting portions 2a and 8a are jointed together by a screw 60 (FIG. 3).

Figure 3:
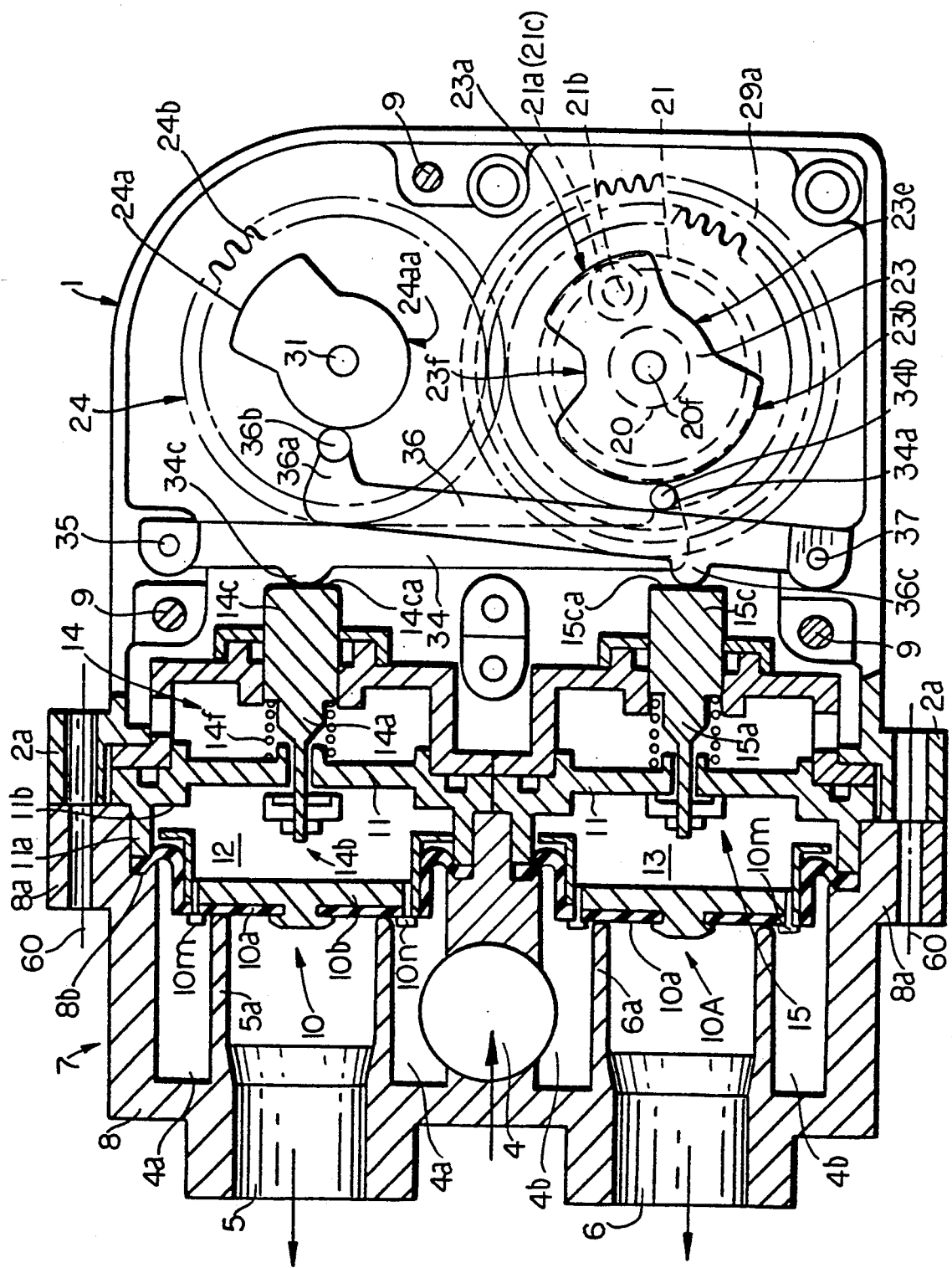
FIG. 3 is a plan view in cross section of the valve shown in FIG. 2, for showing the arrangement of a mechanical timer mechanism, a main valve, and a pilot valve mechanism.
Figure 4:
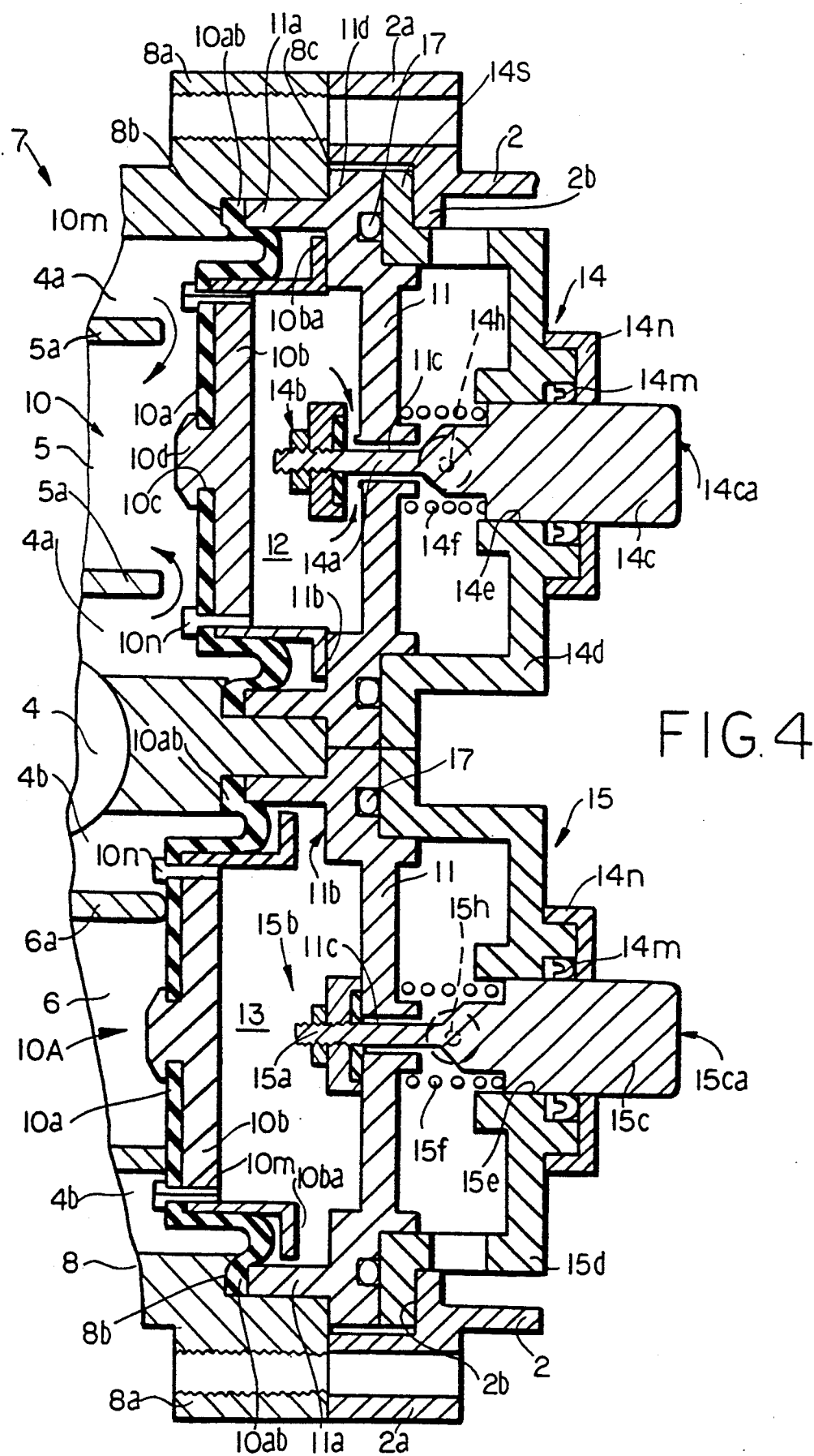
FIG. 4 is an enlarged cross section of the main valve and the pilot valve shown in FIG. 3.

The valve mechanism 7 is next described in detail by referring to FIGS. 3, 4, and 7. The first delivery port 5 and the second delivery port 6 are aligned on one end surface of the valve body 8. These ports 5 and 6 are provided with cylindrical valve seats 5a and 6a, respectively, protruding into the body. Annular pressure chambers 4a and 4b are formed around the valve seats 5a and 6a, respectively. The chambers 4a and 4b are in communication with the water supply port 4 formed at the top of the body.

Main valves 10 and 10A are disposed opposite to the valve seats 5a and 6a, respectively, in such a manner that the valves can move into and out of contact with their respective valve seats, for opening and closing them. Since the main valves 10 and 10A have the same structure, the structure of only the valve 10 is described. As shown also in FIG. 16, the main valve 10 consists of a diaphragm 10a made from a resilient material such as rubber and a holder 10b (FIG. 19) for holding the diaphragm. The holder 10b has a protruding portion 10d having a head. This protruding portion 10d is mounted with a press fit in a large hole 10c formed in the center of the diaphragm 10a. Two holes 10e and 10f are formed in the diaphragm 10a in symmetrical positions near the outer periphery of the diaphragm. Presser pins 10m and 10n are inserted in the holes 10e and 10f, respectively. In this way, the diaphragm 10a a is coupled to the holder 10b. The pins 10m and 10n have base portions mounted with a press fit in holes 10h and 10k (FIG. 19), respectively, formed in the holder 10b.

The diaphragm 10a has outer portions 10ab bent back at the position of a thin-walled portion 10aa. The valve body 8 has short cylindrical valve-holding portions 8b in which the outer portions 10ab are respectively fitted. Valve-holding portions 11a which are fitted in the valve-holding portions 8b, respectively, hold the outer portions 10ab in position. The flange portion 10ba of the holder 10b can slide inside a cylindrical valve-holding portion 11a. Movement of the flange portion is restricted by an annular step portion 11b.

The main valves 10 and 10A move into and out of contact with the valve seats 5a and 6a, respectively, to connect the water supply port 4 either with the water delivery port 5 or with the water delivery port 6. Pressure-adjusting chambers 12 and 13 in pilot valve mechanisms 14 and 15, respectively, are formed at the back of the main valves 10, 10A, respectively. These pressure-adjusting chambers 12 and 13 are formed by a center plate 11 which has the aforementioned valve-holding portions 11a.

Figure 15:
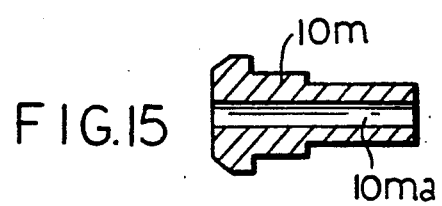
FIG. 15 is a cross-sectional view of a member having an orifice.

The presser pins 10m and 10n press the diaphragm 10a against the holder 10b. As shown in FIG. 15, one pin 10m is provided with an orifice 10ma to place the pressure chambers 4a, 4b in communication with the pressure-adjusting chambers 12, 13, respectively. The pressure chambers 4a and 4b are in communication with the water supply port 4. The other presser pin 10n is not hollow but solid. The orifice 10ma can be replaced by a thin hole extending through both diaphragm 10a and holder 10b.

As shown in FIG. 4, the pilot valve mechanisms 14 and 15 bring the main valves either into their delivery positions (see the main valve 10) at which the water supply port 4 is connected with the delivery port 5 or into their cutoff positions (see the main valve 10A) at which the water supply port 4 is disconnected from the delivery port 6. Since the pilot valve mechanisms 14 and 15 have the same structure, the structure of only the mechanism 14 is described. With respect to the mechanism 15, only corresponding reference numerals are given except for the center plate 11.

Figure 23:
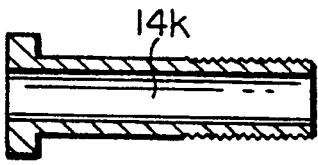
FIG. 23 is a cross-sectional view of a pressure relief pipe.
Figures 27A, 27B:
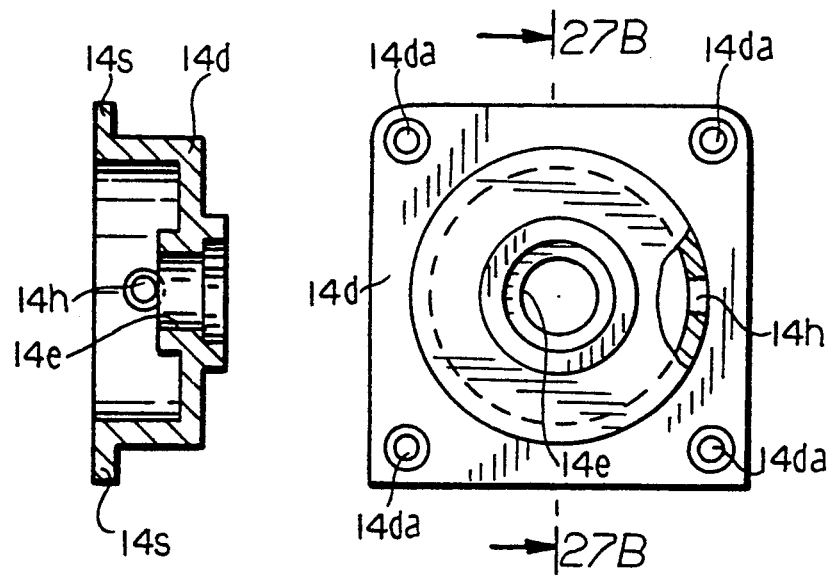
FIG. 27(a) is a rear view of the valve guide of the pilot valve shown in FIGS. 3 and 4.
FIG. 27(b) is a cross-sectional view taken on line A—A of FIG. 27(a)

A valve shaft 14a has a reduced portion inserted in a valve hole 11c formed in the center plate 11. A pilot valve 14b mounted at the front end opens or closes the valve hole 11c. The valve shaft 14a also has a base portion 14c which is slidably inserted in a guide hole 14e formed in a valve guide 14d (FIG. 27). This guide 14d overlaps the center plate 11. An O ring 17 used as an airtight seal is mounted between the valve guide 14d and the center plate 11 near the outer periphery. The valve guide 14d and the center plate 11 are provided with mounting holes 14da (only one is shown in FIG. 27) in which screws (not shown) are inserted. These screws are screwed into tapped holes 8c (FIG. 7(b)) formed in the valve body 8, so that the guide 14d and the center plate are rigidly mounted to the valve body 8. An extensible coil spring 14f is resiliently mounted between the center plate 11 and the step portion of the valve shaft 14a to bias the pilot valve 14b in such a direction as to close the valve hole 11c. The valve guide 14d is provided with a water discharge hole 14h (FIG. 27) to relieve the pressure inside the pressure-adjusting chamber 12 or 13. A pressure relief pipe 14k as shown in FIG. 23 is screwed into this water discharge hole 14h and in communication with the top of the flush tank or the toilet bowl via a hose (not shown).

Figure 24:
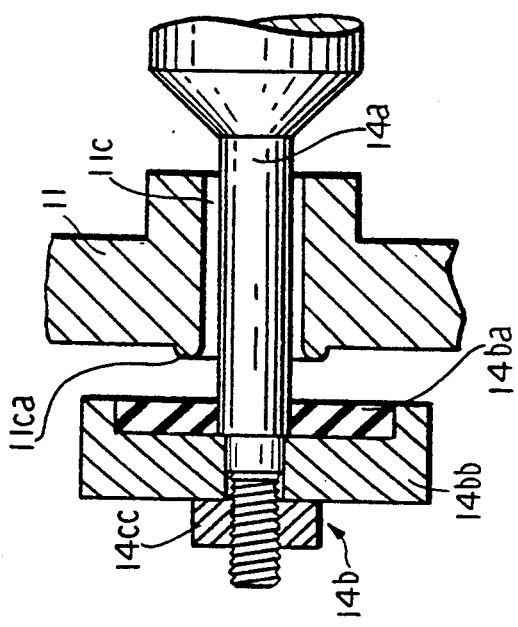
FIG. 24 is an enlarged cross section of main portions of the pilot valve mechanism shown in FIG. 3.

The pilot valve is now described in detail by referring to FIG. 24. The pilot valve 14b comprises a seal body 14ba made from rubber or the like, a valve body 14bb holding the seal body 14ba, and a nut 14bc that securely fixes the seal body and the valve body to the valve shaft. The seal body 14ba is inserted in the front end portion of the valve shaft. The valve shaft 14a and the valve 14b are coupled together in a watertight manner, i.e., leakage of the inside water is prevented, and the shaft 14a and the valve 14b withstand the water pressure. Thus, the pressure inside the pressure-adjusting chamber 12 is prevented from decreasing. An annularly protruding valve seat 11ca is formed in the valve hole 11c formed in the center plate 11.

As shown in FIGS. 3 and 4, rubber packing 14m of V-shaped cross section is mounted between the guide hole 14e of the valve guide 14d and the base portion 14c of the valve shaft. The packing 14m is retained by a cuplike presser member 14n. The packing 14m is oriented in the illustrated direction when it is mounted, to alleviate the load imposed on the depression operation (described later) of the timer unit.

Figures 8A, 8B:
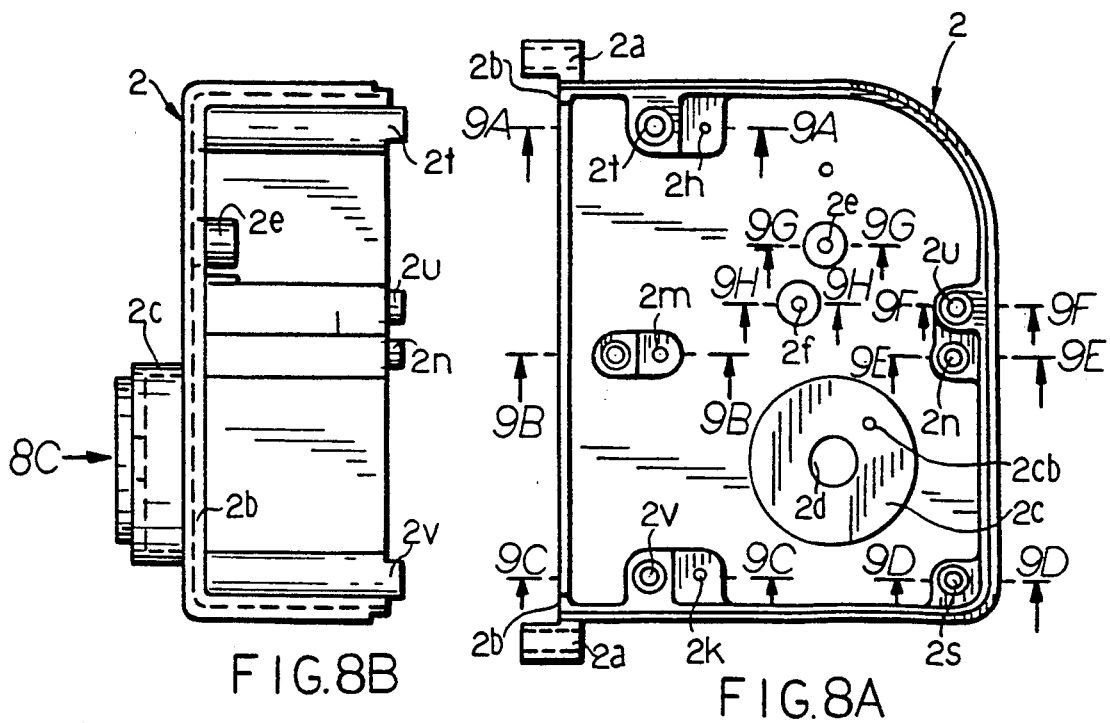
FIG. 8(a) is a plan view of the first case shown in FIGS. 1 and 2, for showing its inner surface.
FIG. 8(b) is a side elevation of the first case shown in FIG. 8(a)

The center plate 11 and the valve guide 14d have their respective flanges 11d and 14s held between a step portion 2b (FIG. 8(a)) of the first case 2 and an end surface 8d (FIG. 7(c)) of the valve body 8. Thus, the center plate 11 and the valve guide 14d are coupled to the body and to the cases.

Figure 1:
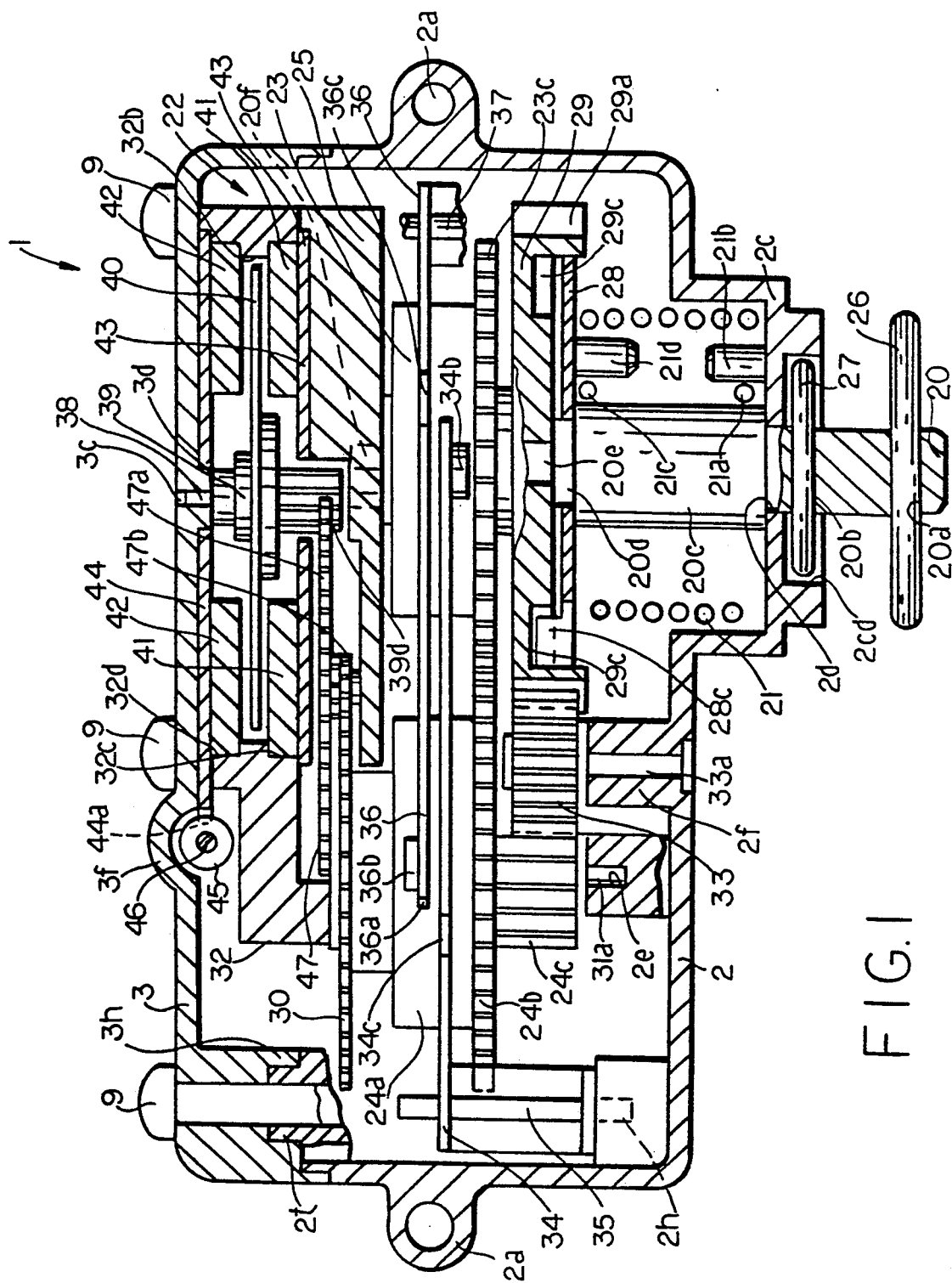
FIG. 1 is a cross-sectional view of a valve control timer unit according to the present invention.
Figures 5, 6:
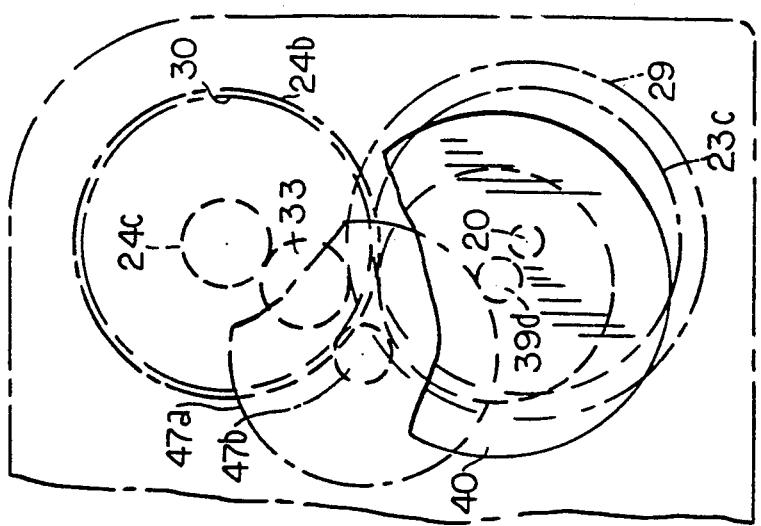
FIG. 5 is a side elevation of the rotary portion of the mechanical timer unit shown in FIG. 3.
FIG. 6 is a schematic plan view of the gear train shown in FIG. 5.

The structure of the timer unit 1 is next described in detail by referring to FIGS. 1, 3, and 5. The timer unit 1 comprises a windup shaft 20, a torsion coil spring 21, a speed-adjusting means 22, plural cams, and a gear train that imparts rotary motion from the windup shaft 20 to the cams. In the illustrated example, a first cam 23 and a second cam 24 are provided, corresponding to the two water delivery ports 5 and 6, respectively. When the windup shaft 20 is rotated, energy is stored in the coil spring 21. When the windup shaft is rotated by the releasing force of the spring, the speed-adjusting means 22 maintains the rotational speed of the windup shaft constant.

Figures 8C, 8D, 8E:
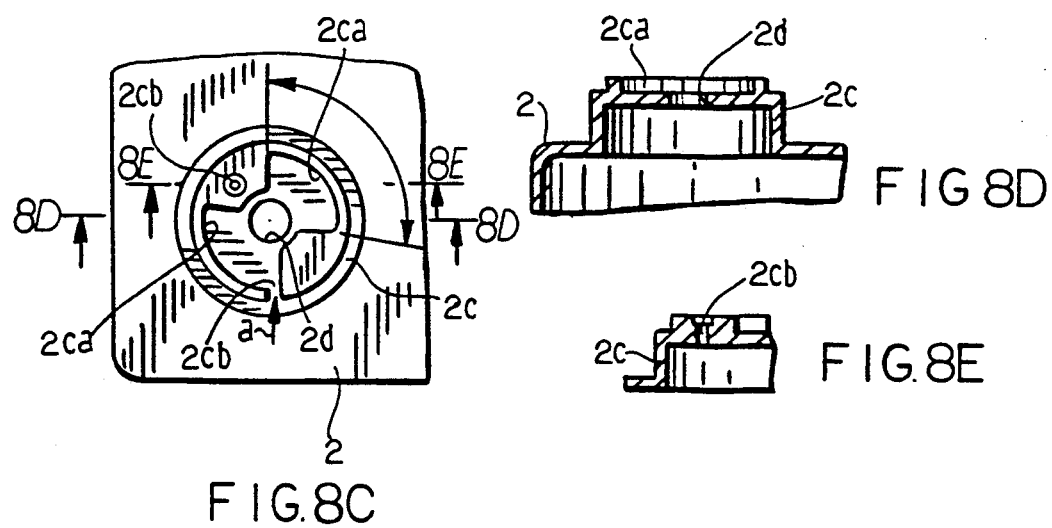
FIG. 8(c) is a view taken in the direction indicated by the arrow A of FIG. 8(b)
FIG. 8(d) is a cross-sectional view taken on line B—B of FIG. 8(c)
FIG. 8(e) is a cross-sectional view taken on line E—E of FIG. 8(c)
Figures 26A, 26B:
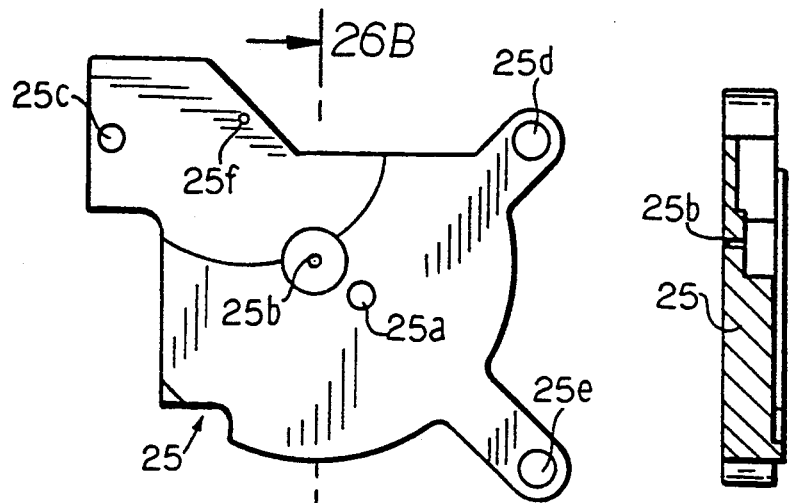
FIG. 26(a) is a plan view of the first middle plate shown in FIG. 1.
FIG. 26(b) is a cross-sectional view taken on line A—A of FIG. 26(a)

The windup shaft 20 is rotatably held in a bearing hole 2d (FIG. 8) formed in a protruding portion 2c of the first case 2 and also in an axial hole 25a formed in a first middle plate 25 (FIG. 26) mounted to the second case 3. As shown also in FIG. 11, the windup shaft 20 has hoses 20a, 20b, an enlarged portion 20c on which the torsion coil spring 21 is wound, a trimmed portion 20d, a reduced portion 20e rotatably holding a first toothed wheel 29 (FIG. 12) and the first cam 23, and an axial end portion 20f held in the bearing hole 25a formed in the first middle plate. A connecting pin 26 is forced into the hole 20a. A rotation-limiting pin 27 is forced into the hole 20b. A ratchet pawl 28 of a non-return mechanism has a slot 28a (FIG. 13) in which the trimmed portion 20d is engaged.

The protruding portion 2c of the first case 2 is provided with a pair of sectorial recessed portions 2ca in which the rotation-limiting pin 27 is fitted, as shown also in FIG. 8. One recessed portion 2ca has a cutout 2cb to urge the pin 27 into the hole 20b in the windup shaft 20 in the direction indicated by the arrow a, the shaft 20 being inserted in the first case 2. The recessed portions 2ca limit rotation of the rotation-limiting pin 27 to restrict the angular movement of the windup shaft 20 within about 100 degrees.

As shown in FIG. 1, a pin 21b that anchors one end 21a of the torsion coil spring 21 is crimped into the cutout 2cb (FIG. 8(a)) in the inner surface of the protruding portion 2c. The other end 21c of the coil spring 21 is anchored to a pin 21d that is fixedly mounted to a hole 28b (FIG. 13) formed in the ratchet pawl 28.

Figures 12A, 12B, 12C:
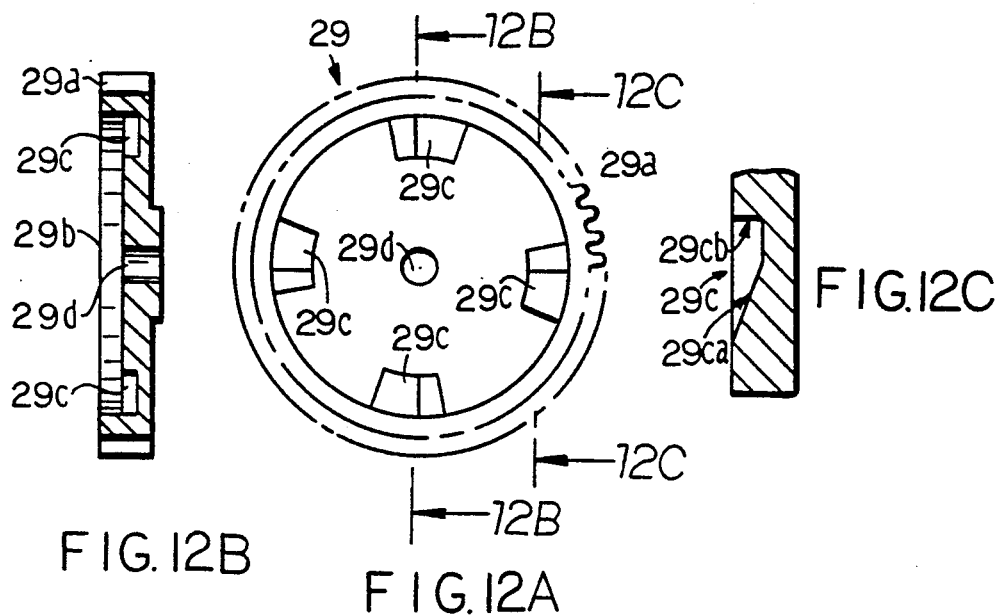
FIG. 12(a) is a bottom view of the first toothed wheel shown in 12(a)
FIG. 12(b) is a cross-sectional view taken on line A—A of FIG. 12(a)
FIG. 12(c) is an enlarged cross section taken on line B—B of FIG. 12(a)
Figures 13A, 13B:
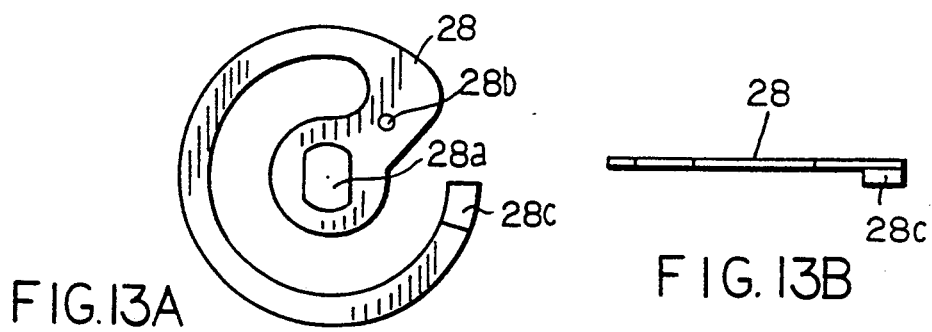
FIG. 13(a) is a plan view of the ratchet pawl shown in FIG. 1.
FIG. 13(b) is a side elevation of the ratchet pawl shown in FIG. 13(a)

As shown in FIG. 13, the ratchet pawl 28 is blanked out of a resilient metal sheet and has an arc-shaped arm portion. The front end 28c of this arm portion is bent toward the first toothed wheel 29. The first toothed wheel 29 has teeth 29a on its outer periphery as shown also in FIG. 12. One end surface of the first toothed wheel 29 has a circular recessed portion 29b receiving the ratchet pawl 28. Four check portions 29c which are spaced 90 degrees from each other are formed in the recessed portion 29b. As shown in FIG. 12(c), each check portion 29c comprises a bottom portion 29ca and an engagement portion 29cb with which the front end 28c of the ratchet pawl 28 rotated by the spring 21 comes into engagement when the energy stored in the spring 21 is released. The bottom portion 29ca is inclined to permit the front end 28c of the ratchet pawl 28 to escape from the check portions easily when the windup shaft 20 is rotated to wind up the torsion coil spring 21 via the ratchet pawl 28. An axial hole 29d in which the reduced portion 20e of the windup shaft 20 is rotatably inserted is formed in the center of the first toothed wheel 29.

The profile of the first cam 23 comprises a first cam surface 23a consisting of a short arc-shaped portion and a second cam surface 23b as shown also in FIG. 21. The arc length of the second cam surface is twice as long as that of the first cam surface. The first cam 23 is formed integrally with a larger fourth toothed wheel 23c. The reduced portion 20e of the windup shaft is rotatable inserted in a hole 23d formed in the center of the first cam 23.

Figure 22A:
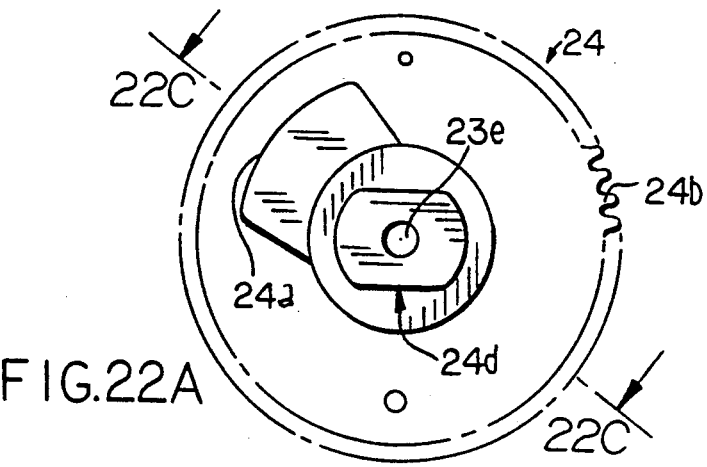
FIG. 22(a) is a plan view of the third toothed wheel shown in FIG. 5, the wheel having a second cam.
Figures 22B, 22C:
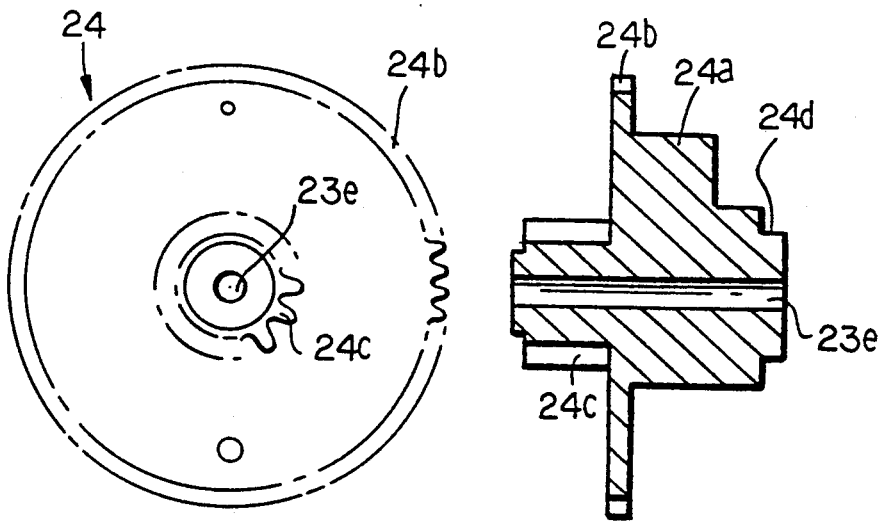
FIG. 22(b) is a bottom view of the third toothed wheel shown in FIGS. 22(a)
FIG. 22(c) is a cross-sectional view taken on line A—A of FIG. 22(a)

As shown also in FIG. 22, the second cam 24 has a cam surface 24a having the same arc length as the first cam surface 23a of the first cam. A third toothed wheel 24b which has the same diameter as the fourth toothed wheel 23c of the first cam and engages with this wheel 23c is formed on the second cam 24. Teeth 24c having a small diameter are formed on the third toothed wheel 24b. A fitting portion 24d over which a fifth toothed wheel 30 fits is formed on one end surface of the cam 24. As shown in FIG. 5, the second cam 24 is rotatably held to a third shaft 31 that is inserted in a hole 24e formed in the center of the cam 24. One end 31a of the third shaft 31 is rotatable held to a support hole 2e (FIGS. 8(a) and 9(g)) formed in the first case 2, while the other end 31b is rotatably held to a bearing hole 32a (FIG. 28) formed in a second middle plate 32.

The second middle plate 32 and the first middle plate 25 support the gear train and the speed-adjusting means 22. The manner in which these middle plates are mounted are described later.

Figure 9A:
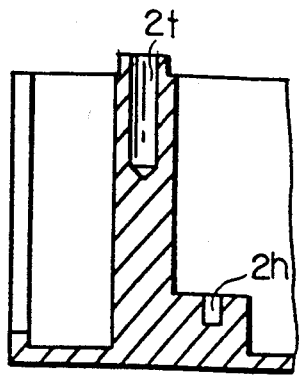
FIG. 9(a) is a cross-sectional view taken on line F—F of FIG. 8(a)
Figure 9B:
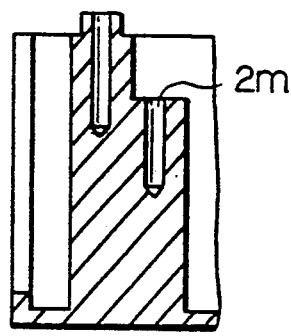
FIG. 9(b) is a cross-sectional view taken on line G—G of FIG. 8(a)
Figure 9C:
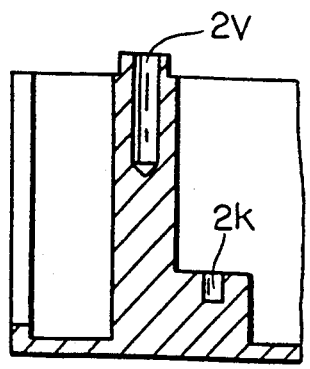
FIG. 9(c) is a cross-sectional view taken on line H—H of FIG. 8(a)
Figure 9D:
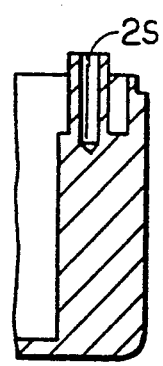
FIG. 9(d) is a cross-sectional view taken on line J—J of FIG. 8(a)
Figure 9G:
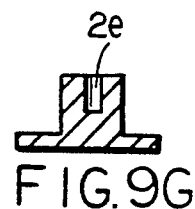
FIG. 9(g) is a cross-sectional view taken on line N—N of FIG. 8(a)
Figure 9E:
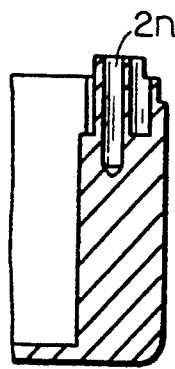
FIG. 9(e) is a cross-sectional view taken on line K—K of FIG. 8(a)
Figure 9F:
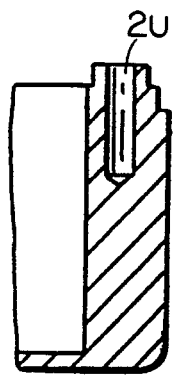
FIG. 9(f) is a cross-sectional view taken on line L—L of FIG. 8(a)
Figure 9H:
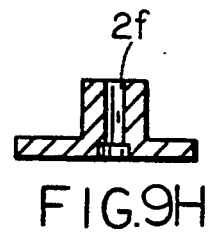
FIG. 9(h) is a cross-sectional view taken on line M—M of FIG. 8(a)

The first case 2 has a bearing portion of (FIGS. 8(a) and 9(h)) to which a second toothed wheel 33 (FIG. 20) is rotatably held by a pivot 33a, as shown in FIGS. 1 and 5. The second toothed wheel 33 is in mesh with the first toothed wheel 29a and also with the third toothed wheel 24c.

Figure 25:
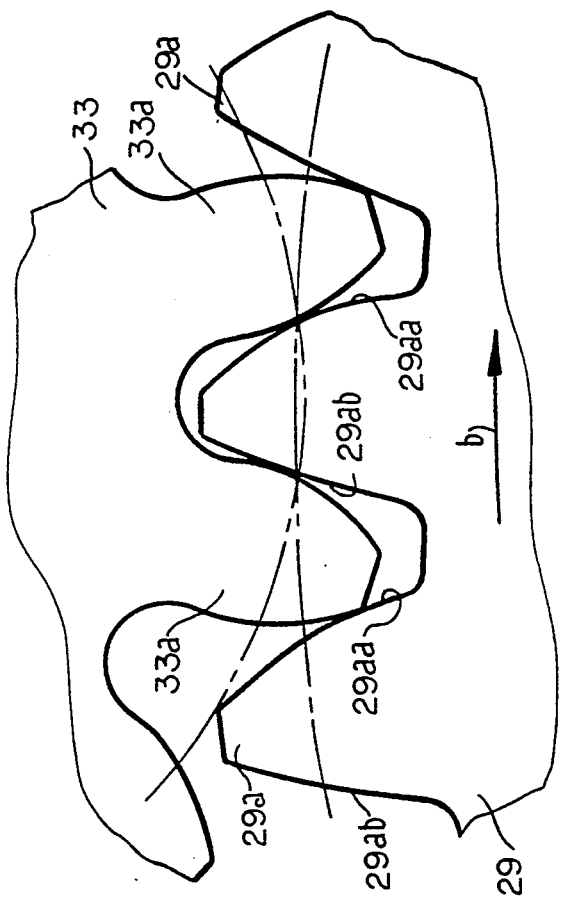
FIG. 25 is an enlarged front elevation of the first and second toothed wheels shown in FIG. 5, for showing their profiles.

The profiles of the first toothed wheel 29 and of the second toothed wheel 33 in mesh with each other are described now. These toothed wheels 29 and 33 have different profiles to prevent the first toothed wheel 29 from rotating when the windup shaft 20 is rotated to store energy in the torsion coil spring 21; otherwise the positions of the cams to which rotation is transmitted from the first toothed wheel 29 would vary. In FIG. 25, the pressure angles of both sides of each tooth 33a of the second toothed wheel 33 are 20° and symmetrical. On the other hand, the pressure angle of the right side 29aa of each tooth 29a of the first toothed wheel 29 is 35°, while the pressure angle of the left side 29ab is 20°. In this way, the profile of the first toothed wheel 29 is special.

Accordingly, when the torsion coil spring 21 is rotated to store energy in it, the first toothed wheel 29 that is rotated in the direction opposite to the direction in which the spring is released by the ratchet pawl 28, i.e., in the direction indicated by the arrow b, tries to rotate the second toothed wheel 33 by its right side 29aa but the teeth 29a cannot mesh with the teeth 33a because of their difference in pressure angle. Hence, the toothed wheel 33 cannot be rotated. When the first toothed wheel 29 is rotated in the direction opposite to the direction indicated by the arrow b by the releasing force of the spring, the first toothed wheel 29 can rotate the second toothed wheel 33 because they agree in pressure angle.

Referring to FIGS. 1 and 3, both ends of a support shaft 35 by which a first lever 34 is swingably held are engaged in a bearing hole 2h (FIGS. 8a and 9(a)) formed in the first case 2 and in a corresponding bearing hole 3a (FIG. 10, (a), (f)) formed in the second case 3. The free end 34a of the first lever 34 is located in a position where it can abut against the cam surface of the first cam 23. A roller 34b is rotatably mounted to the free end 34a. The first lever 34 has a protrusion 34c bearing against the end surface 14ca of the base portion 14c of the valve shaft of the pilot valve mechanism 14. When the roller 34b rolls on the cam surfaces 23a and 23b, the protrusion 34c pushes the valve shaft 14a of the pilot valve mechanism 14 against the force of the spring 14f to open the valve (see FIG. 4).

Both ends of a shaft 37 by which a second lever 36 is swingably held are engaged in a bearing hole 2k (FIGS. 8(a) and 9(c)) formed in the first case 2 and also in a corresponding bearing hole 3b (FIG. 10, (a) and (9)) formed in the second case 3. The free end 36a of the second lever 36 is located in a position where it can bear against the cam surface of the second cam 24. A roller 36b is rotatably mounted to the free end 36a. The second lever 36 has a protrusion 36c abutting against one end surface 15ca of a valve 18 shaft 15c of the pilot valve mechanism 15. When the roller 36b is rolled on the cam surface 24a, the protrusion 36c pushes the base portion 15c of the valve shaft of the pilot valve mechanism 15 in such a direction as to open the valve.

The structure of the speed-adjusting means 22 is next described by referring to FIGS. 1 and 5. This speed-adjusting means is formed by an eddy-current governor mechanism. A seventh toothed wheel 38 is rotatably mounted in a bearing hole 25b (FIG. 26) formed in the first middle plate 25 and also in a bearing hole 3c (FIG. 10) formed in the second case 3. A seventh toothed wheel 39 (FIG. 18) is mounted with a press fit in the seventh shaft 38. The seventh toothed wheel 39 has a flange 39a provided with a pin 39b. The seventh toothed wheel has a trimmed boss portion 39c. After a rotor 40 consisting of a metal sheet made of aluminum or copper is fitted over the boss portion 39c, the pin 39b is crimped against the boss portion 39c.

Figure 29A:
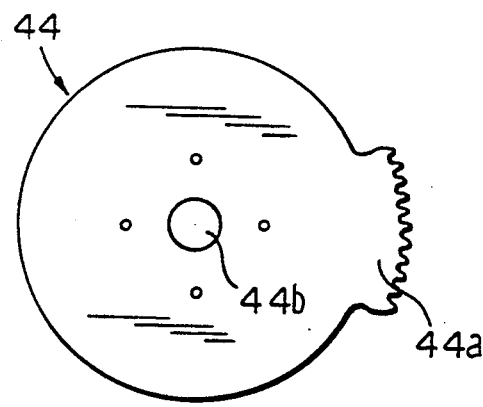
FIG. 29(a) is a plan view of the movable yoke shown in FIGS. 1 and 5.

As best shown in FIG. 1, the rotor 40 is located inside a round window 32b (FIG. 28) formed in the second middle plate 32. The second middle plate 32 has annular step portions 32c and 32d which are located on opposite sides of the window 32b. Annular magnet plates 41 and 42 are disposed on the step portions 32c and 32d, respectively. As shown in FIG. 29(c), in each of the magnet plates 41 and 42, south and north poles are alternately arranged circumferentially.

Figure 29B:
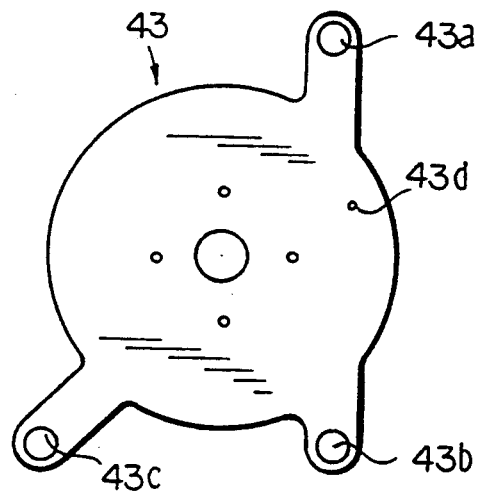
FIG. 29(b) is a plan view of the stationary yoke shown in FIGS. 1 and 5.
Figure 29C:
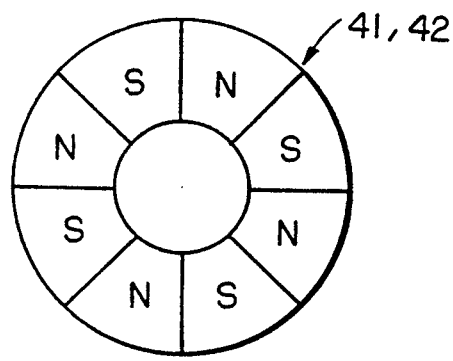
FIG. 29(c) is a plan view of the magnet plates shown in FIGS. 1 and 5.

The magnet plate 41 is mounted to one surface of a stationary yoke 43 (FIG. 29(b)). The magnet plate 42 is adhesively bonded to a movable yoke 44 (FIG. 29(a)). If the magnet plates held to the yokes 43 and 44 separate from the yokes, a space in which rotation of the rotor 40 is maintained is secured between the magnet plates 41 and 42, since the step portions 32c and 32d which are spaced from each other act as spacers.

The first middle plate 25, the stationary yoke 43, and the second middle plate 32 shown in FIGS. 26, 29(b), and 28 are placed to overlap each other in this order. Their mounting portions 25c, 43a, and 32e are placed on a mounting protrusion 2m (FIGS. 8(a) and 9(b)) of the first case 2 and screwed to this protrusion. After fitting the mounting portions 25d, 43b, and 32f over a mounting protrusion 2n (FIGS. 8(a) and 9(e)) of the first case 2, the mounting portions 25e, 43c, and 32h are fitted over a mounting protrusion 2s (FIGS. 8(a) and 9(d)) of the first case 2. Then, these mounting portions are screwed to the protrusion.

As shown in FIG. 29(a), a portion of the outer periphery of the movable yoke 44 has teeth 44a in mesh with a worm 45 (FIG. 1). The yoke 44 is provided with a hole 44b around the center of rotation. The second case 3 has a protrusion 3d around the center of rotation. This protrusion 3d is rotatably engaged in the hole 44b. That is, the magnet plate 42 can rotate with the movable yoke 44.

Figure 14:
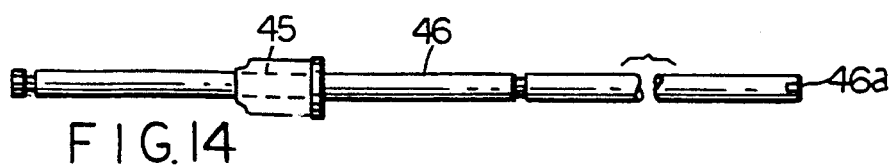
FIG. 14 is a side elevation of the adjusting shaft of the timer unit shown in FIG. 1.

The worm 45 is mounted with a press fit in an adjusting shaft 46 having a slit 46a at its one end, as shown in FIG. 14. The worm 45 is maintained in mesh with the teeth 44a of the movable yoke 44. The adjusting shaft 46 is rotatably held in bearing portions 32k (FIG. 28) of the second middle plate 32. The end portion of the adjusting shaft 46 having the slit 46a is inserted in an adjusting hole 3e (FIGS. 10, (c), (d), 32) formed in one side surface of the second case 3. The second case 3 has a swelling portion 3f (FIGS. 1, 2, 10, and 32) to permit the worm 45 to escape.

When the adjusting shaft 46 is rotated, the movable yoke 44 rotates to vary the positional relation of the magnetic poles of the magnet plate 42 integral with the yoke 44 to the magnetic poles of the stationary magnet plate 41, thereby changing the magnetic flux density. This changes the produced eddy current to thereby adjust the braking force applied to the rotor 40. This braking force to the rotor 40 is transmitted to the windup shaft 20, or the first toothed wheel 29, via an accelerating gear train described next to apply a braking force to the windup shaft 20.

Referring to FIGS. 1 and 5, a sixth toothed wheel 47 acting as an accelerating gear has enlarged teeth 47a which are in mesh with teeth 39d of the seventh toothed wheel 39d. The sixth toothed wheel 47 further includes reduced teeth 47b in mesh with the fifth toothed wheel 30. The sixth toothed wheel 47 is held by a sixth shaft 48 which is rotatably held in a bearing hole 25f (FIG. 26(a)) formed in the first middle plate 25 and in a bearing hole 43d (FIG. 29(b)) formed in the stationary yoke 43.

The gear train beginning with the windup shaft 20 and ending with the rotor 40 of the adjusting means 22 is described next by referring to FIG. 6. When the torsion coil spring is released, the first toothed wheel 29 is rotated, thus rotating the third toothed wheel 24c (24b) via the second toothed wheel 33. Rotation of the toothed wheel 24c integral with the second cam 24 is transmitted to the fourth toothed wheel 23c via the third toothed wheel 24b. Thus, the first cam 23 integral with the fourth toothed wheel 23c is rotated. At the same time, the fifth toothed wheel 30 rotates the sixth toothed wheel 47b (47a) at a high speed. Rotation of the sixth toothed wheel 47 rotates the seventh toothed wheel 39d at an increased speed. This rotates the rotor 40 at a high speed.

The first case 2 and the second case 3 are coupled together in the manner described now. Referring to FIGS. 8 and 9, the first case 2 has protrusions 2t, 2u, and 2v having holes used for tapping. The second case 3 has fitting portions 3h, 3k, and 3m provided with holes extending therethrough to permit insertion of screws, as shown in FIG. 10. The protrusion 2t and the fitting portion 3h are shown in FIG. 1 as representative of these protrusions and fitting portions. After the protrusions are fitted in their respective fitting portions, they are joined together by screws 9 (FIGS. 2 and 32) inserted from the side of the second case 3.

Figure 32:
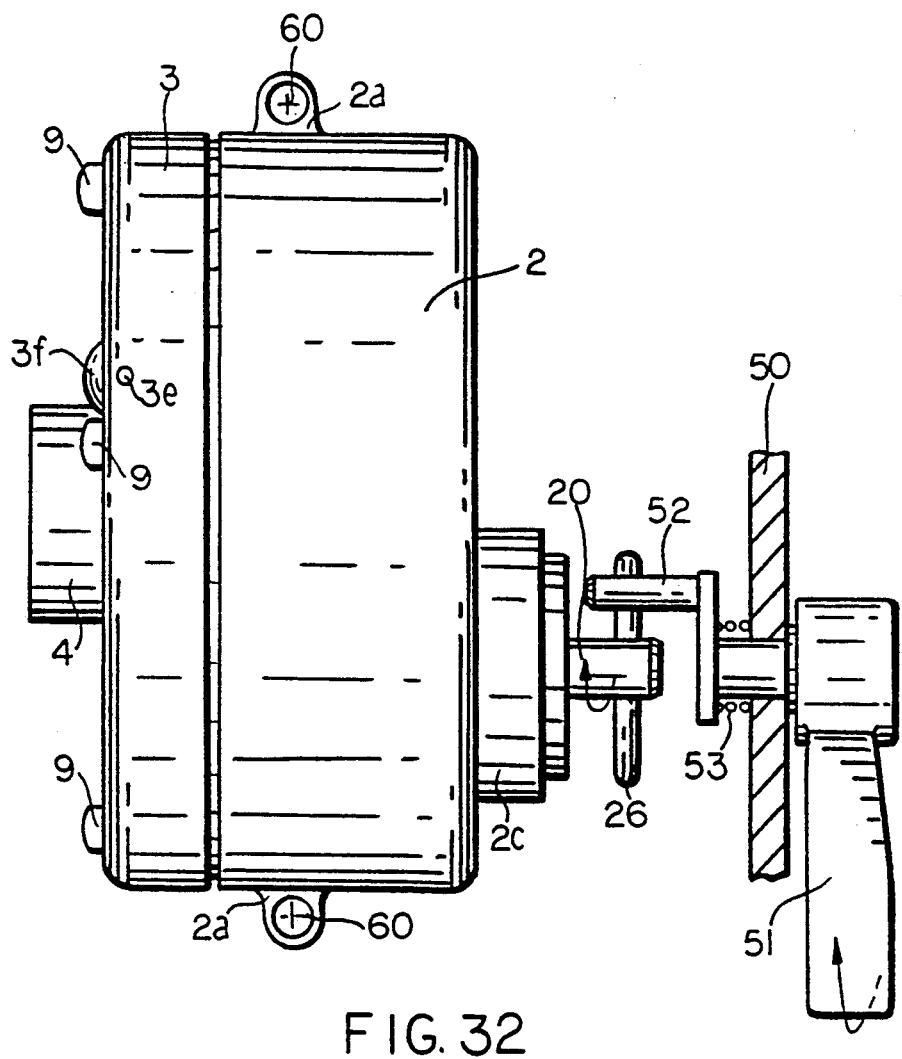
FIG. 32 is a side elevation of a means for storing energy in a spring mounted in a timer unit.

One example of the means for rotating the windup shaft 20 to store energy in the torsion coil spring 21 is next described by referring to FIG. 32. The connecting pin 26 pressed into the windup shaft 20 is located in such a position that the pin can engage with a pin 52 which is substantially integral with an operation lever 51. This lever 51 is rotatably mounted, for example, to one side wall 50 of the lower tank of the flush toilet. A torsion spring 53 urges the lever 51 to rotate back to its original position. When the operation lever 51 is rotated in the direction indicated by the arrow, the pin 52 rotates the windup shaft 20 in the direction indicated by the arrow via the connecting pin 26. The torsion coil spring 21 is wound up, whereby energy is stored in it. When the operation lever 51 is released from the hand, the resilience of the spring 53 returns the lever to its original position. Then, the releasing force of the spring 21 rotates the windup shaft 20 in the direction opposite to the direction indicated by the arrow. The speed of the rotation is made constant and low by the adjusting action of the speed-adjusting means 2. The adjusting action will be described in greater detail below.

The torsion coil spring 21 is set up in the manner now described. As shown in FIG. 1, when the cases 2 and 3 accommodating the components and the valve body 8 are assembled together, the connecting pin 26 and the rotation-limiting pin 27 are not yet inserted into the windup shaft 20. After the cases and the valve body are assembled together, the connecting pin 26 is first forced into the windup shaft 20. This shaft 20 is then rotated so that it makes one revolution in the direction to store energy in the spring. In this way, the spring is wound in advance. Thereafter, the rotation-limiting pin 27 is forced into the hole 20b in the windup shaft 20 from the cutout 2cb (FIG. 8(c)) in the case 2 in the direction indicated by the arrow a. Mounting of this pin 27 permits the previously wound torsion coil spring 21 to be used with a spring constant lying in a stable region. The rotation of the rotation-limiting pin 27 is restricted within about 100 degrees by the recessed portions 2ca (FIG. 8(c)). In other words, when the windup shaft 20 is wound up, the rotation of this shaft is restricted within about 100 degrees. However, the shaft 20 is returned through about 10 degrees by the structure of the ratchet mechanism.

The operation of the embodiment constructed as described above is described below. When the valve mechanism 7 cuts off the passage of water, i.e., when the main valves 10 and 10A are placed in their cutoff positions (see the position of the main valve 10A shown in FIGS. 3 and 4) where they disconnect the water delivery ports 5 and 6 from the water supply port 4, the pilot valve mechanisms 14 and 15 are so positioned that the valve hole 11c is closed by the valve 15b (14b). The position of the pilot valve mechanism 15 under this condition is shown in FIGS. 3 and 4. The positions of the pilot valve mechanisms 14 and 15 are determined by the positions of the cams of the timer unit 1.

When the main valve 10 is placed in its cutoff position, the first cam 23 places the roller 34b of the first lever 34 in a position where the roller bears against the base 23e of the cam. This relieves the first lever 34 of the task of pushing the valve shaft 14a of the pilot valve mechanism 14. FIG. 3 shows the condition in which the valve is being pushed. On the other hand, when the main valve 10A is placed in its cutoff position, the second cam 24 is placed in such an angular position that the roller 36b of the second lever 36 abuts against the base 24aa of the cam. This stops the second lever 36 from pushing the valve shaft 15a. At this time, the torsion coil string 21 is wound only in advance, and no further energy is stored on the spring.

The pressure produced when the main valves 10 and 10A are closed is described now. When the valve holes 11c in the pilot valve mechanisms 14 and 15 are closed, the pressure inside the pressure-adjusting chambers 12 and 13 are made equal to the pressure inside the pressure chambers 4a and 4b which are in communication with the water supply port 4 via orifices 10m formed in the main valves. Under this condition, the resilience of the diaphragm 10a moves the main valves 10 and 10A in such a direction that the valve seats 5a and 6a (FIG. 4) are closed. As a consequence, the water delivery ports 5 and 6 are disconnected from the water supply port 4.

When the operation lever 51 shown in FIG. 32 is moved in the direction indicated by the arrow, the lever rotates the windup shaft 20 via the connecting pin 26. Since the rotation of the rotation-limiting pin 27 is restricted within 100 degrees by the recessed portions 2cd, the rotation of the shaft 20 is limited. The spring 53 returns the operation lever 51 to its original position.

Referring to FIG. 1, when the windup shaft 20 is rotated through 100 degrees, energy is stored in the torsion coil spring 21. Rotation of the windup shaft 20 rotates the ratchet pawl 28 through 100 degrees. However, when the front end 28c of the pawl moves backwardly through about 10 degrees, the front end comes into engagement with any one of the check portions 29c of the first toothed wheel 29 which are spaced 90° from each other and stops at this position.

When the ratchet pawl 28 is rotated, the first toothed wheel 29 tries to follow the pawl and rotate. However, the toothed wheel 29 trying to rotate in the windup direction tries to rotate the second toothed wheel 33 by its side surface having a pressure angle of 35 degrees. Therefore, the second toothed wheel cannot be rotated. Consequently, the gear train extending from the second toothed wheel to the cams 23, 24 does not turn; the positions of the cams do not vary.

When the operation lever 51 moves away from the connecting pin 26, the energy stored in the torsion coil spring 21 is released, thus rotating the first toothed wheel 29 via the ratchet pawl 28. Rotation of the first toothed wheel 29 in this direction causes its side surface having the same pressure angle of 20° as the teeth of the second toothed wheel 33 to rotate the second toothed wheel. This rotates the third toothed wheel 24b (24c), thus rotating the second cam 24. The third toothed wheel 24b rotates the fourth toothed wheel 23c in mesh with the third wheel. As a result, the first cam 23 is rotated.

When the first cam 23 and the second cam 24 rotate, the operation for opening the valves is initiated. Before describing this operation, the operation of the speed-adjusting means 22 for adjusting the rotational speeds of the cams is described. When the fifth toothed wheel 30 substantially integral with the third toothed wheel 24b is rotated, the rotation is transmitted to the sixth toothed wheel 47 with a speed increase. The rotation is further transmitted to the seventh toothed wheel 39d with a speed increase. The rotor 40 integral with the seventh toothed wheel 39d is rotated at a high speed within a magnetic field produced by the magnet plates 41 and 42 and so the rotation is braked. The braking force applied to the rotor 40 is transmitted to the first toothed wheel 29 via the gear train. Hence, the windup shaft 20, i.e., the first toothed wheel 29 coupled to this shaft 20 via the ratchet pawl 28, rotated by the releasing force of the torsion coil spring 21 is rotated at a constant speed.

The first cam 23 and the second cam 24 which are rotated by the gear train are made to rotate at given speeds in synchronism, because the releasing force of the torsion coil spring is adjusted.

The adjustment of the braking force by the speed-adjusting means 22 is made by rotating the movable yoke 44. The magnitude of the eddy current produced in the rotor 40 is changed by varying the magnetic flux density of the magnetic field set up between the magnet plates 41 and 42. Therefore, the position at which the movable yoke 44 meshes with the worm 45 is varied by rotating the adjusting shaft 46. This varies the positional relation between the opposite magnetic poles of the magnets, thus changing the braking force. This braking force is adjusted according to the time required for the windup shaft 20 to rotate back to its initial position after the shaft is rotated in the windup direction.

As an example, it is assumed that water is delivered from the first water delivery port 5 to the flush tank for (t+t×2) seconds and that water is delivered from the second delivery port 6 to the cleaning warmed water tank for t seconds. If t=5 seconds, the main valve 10 should be opened for 15 seconds, and the main valve 10A should be opened for 5 seconds. In this case, if both delivery ports 5 and 6 are opened simultaneously, there arises a possibility that the amounts of delivered water become nonuniform. Therefore, it is necessary to control the main valves 10 and 10A in such a way that they are opened one after another. In consequence, the total operation time of the timer unit 1 is set to 20 seconds. The braking force is so adjusted that the time taken for the release of the torsion coil spring 21 wound up is 20 seconds. After the completion of the adjustment of the time, adhesive is injected into the adjusting hole 3e (FIG. 32) to prevent the shaft 46 from rotating.

Figure 33A:
FIGS. 33(a) and 33(b) are a time chart illustrating the manner in which valves are opened and closed according to periods of time set into a timer.
Figure 33B:
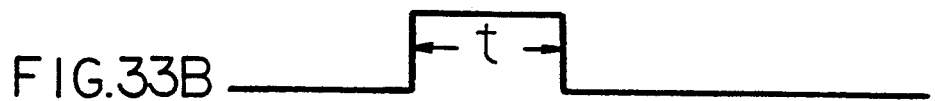

FIG. 33 illustrates the sequence in which the valves are opened and closed by the first cam 23 and the second cam 24. FIG. 33(a) illustrates the operation of the valve actuated by the first cam 23. FIG. 33(b) illustrates the operation of the valve actuated by the second cam. First, the first cam 23 pushes the first lever 34 by its first cam surface 23a for t (=5) seconds to open the valve. Then, the valve is closed. Subsequently, the second cam 24 pushes the second lever 36 for t (=5) seconds to open the valve. Then, the valve is closed. Subsequently, the second cam surface 23b of the first cam 23 opens the valve for t×2 (=10) seconds and then closes it.

Specifically, the first cam surface 23a of the first cam 23 shown in FIGS. 3 and 21 has such a length that it pushes the first lever 34 for 5 seconds. The second cam surface 23b has such a length that it pushes the first lever 34 for 10 seconds. The cam surface 23f between the first cam surface and the second cam surface pushes the first lever 34 backward for 5 seconds. The cam surface 24a of the second cam 24 has such a length that it pushes the second lever 36 for 5 seconds.

Referring to FIG. 3, the first lever 34 whose roller 34b bears against the cam base 23e rides up the first cam surface 23a as the first cam 23 turns. Thus, the first lever 34 rotates about the support shaft 35. The protrusion 34c of the lever 34 bears against the end surface 14ca of the valve shaft 14a to push this shaft 14a against the resilient force of the spring 14f in the direction to open the valve. In FIG. 3, the positional relation between the roller 34b and the second cam surface 23b is such that the pilot valve mechanism 14 is placed in a position where it opens the valve, for the sake of illustration. In the condition of FIG. 3, the main valve 10 is not opened.

When the valve shaft 14a is moved, the pilot valve 14b opens the valve hole 11c as shown in FIG. 4. Then, the water in the pressure-adjusting chamber 12 at a pressure higher than the atmospheric pressure is discharged from the valve hole 11c and from the water discharge hole 14h. As the water is discharged, the pressure inside the pressure-adjusting chamber 12 drops. At the same time, the pressure inside the annular pressure chamber 4a which is subjected to the pressure from the water supply port 4 becomes higher. The main valve 10 is moved away from the valve seat 5a, as shown in FIG. 4, into its communication position where it connects the water supply port 4 with the first water delivery port 5. In this way, water from the water supply port 4 is forced toward the first water delivery port 5.

When the main valve 10 moves in the direction to open the valve while receiving the pressure from the water supply port 4, the outflow of water from the valve hole 11c is promoted. Movement of the main valve 10 is not hindered. Therefore, as soon as the pilot valve mechanism 14 opens the pressure-adjusting chamber 12, the main valve 10 is moved into its communication position. The main valve 10 is retained in its communication position for about 5 seconds. During this time interval, water is supplied into the 30 flush tanks (not shown).

When the roller 34b of the first lever 34 falls onto the cam surface 23f from the first cam surface 23a, the resilient force of the spring 14f moves the valve shaft 14a of the pilot valve mechanism to close the valve hole 11c. Under this condition, the water in the pressure-adjusting chamber 12 cannot escape anywhere. The water entering from the orifice 10m gradually increases the pressure inside the pressure-adjusting chamber.

When the resilient restoring force of the main valve 10 becomes larger than the difference between the pressure at the water supply port 4 and the pressure inside the pressure-adjusting chamber 12, the main valve 10 moves toward its cutoff position shown in FIG. 3. Then, the main valve comes into abutment with the valve seat 5a, cutting off the passage between the water supply port 4 and the first water delivery port 5.

When the operation of the first cam 23 to open and close the main valve 10 is completed, the second cam surface 24a of the second cam 24 swings the second lever 36. The protrusion 36c of this lever 36 moves the valve shaft 15c of the pilot valve mechanism 15 in the direction to open the valve. Then, the main valve 10A operates in the same way as the main valve 10. The valve 10A places the water supply port 4 in communication with the second water delivery port 6 for 5 seconds. Therefore, water is supplied into the cleaning warmed water tank (not shown) via the second water delivery port 6 for 5 seconds.

When the second cam 24 closes the main valve 10A, the second cam surface 23b of the first cam 23 pushes the roller 34b to thereby swing the first lever 34. This again moves the pilot valve mechanism 14 in the direction to open the valve. At this time, the pilot valve mechanism 14 and the main valve 10 operate similarly to the foregoing except that the communication position is maintained for 10 seconds by the second cam surface 23b. Thus, the first water delivery port 5 is connected with the water supply port 4 for 10 seconds. During this time interval, a corresponding amount of water is supplied into the flush tank.

When the roller 34b of the first lever 34 moves downward onto the cam base 23e of the first cam 23, the main valve 10 is moved into its cutoff position by the pilot valve mechanism 14. The cams 23 and 24 control the operation of the main valves 10 and 10A in the sequence illustrated in FIG. 33. After the main valve 10 is closed finally, the release of the torsion coil spring 21 continues. The release of the spring 21 is terminated when the rotation-limiting pin 27 of the windup shaft 20 is locked by the recessed portions 2cd (FIG. 8(c)). At this time, the rollers 34b and 36b of the levers bear on the cam bases 23e and 24aa, respectively, of the cams.

Figure 30:
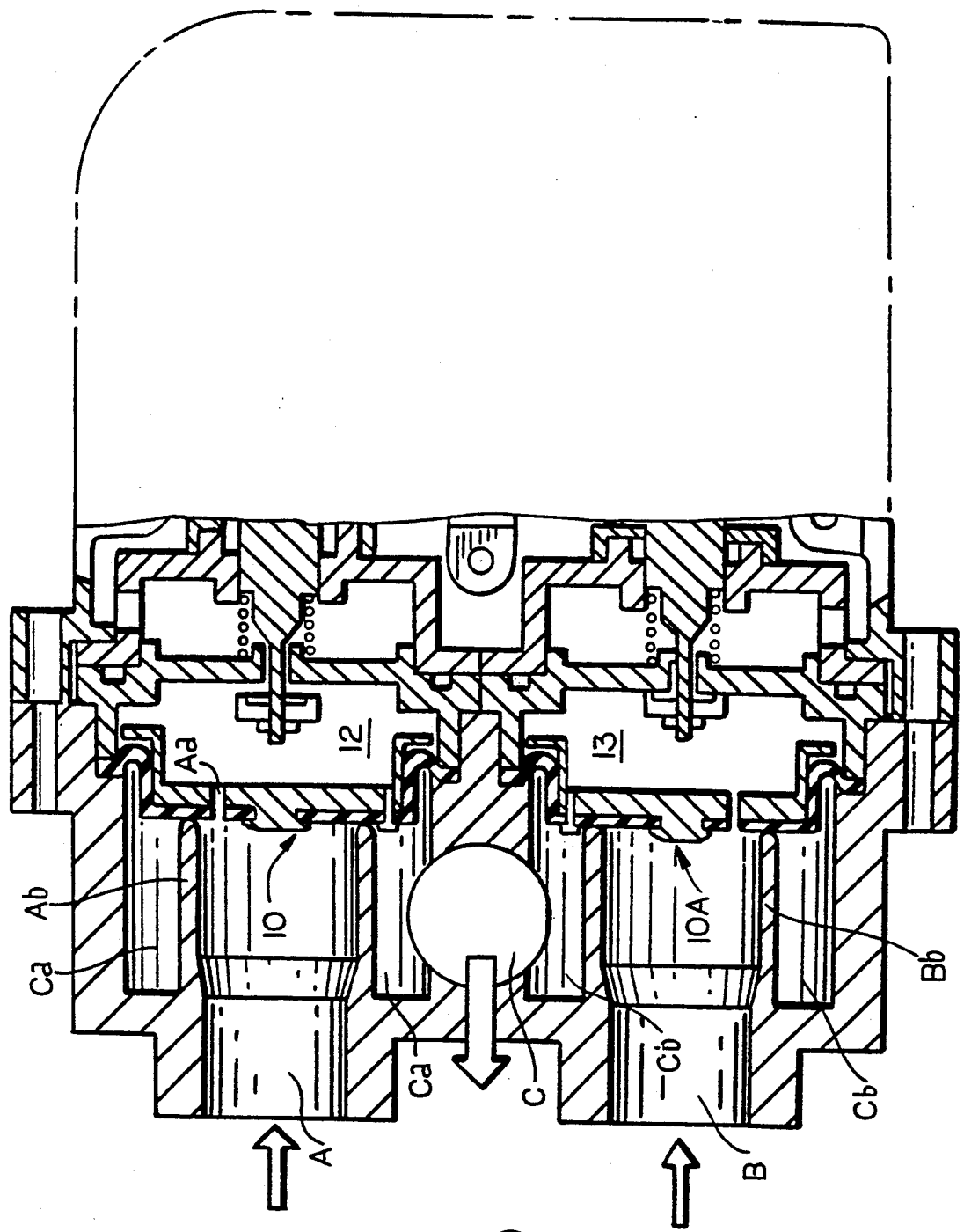
FIG. 30 is a fragmentary cross section of another valve to which the present invention is applied.

In the description thus far, the fluid passages of the valve mechanisms which distribute the water supplied from the single water supply port 4 between the water delivery ports 5 and 6 are switched. Another type of valve mechanism is shown in FIG. 30. This mechanism receives liquid from plural liquid supply ports A and B and delivers liquid from a single delivery port C. Main valves 10 and 10A have the same structure as that of the above described embodiment. An orifice Aa is formed between the water supply port A and the pressure-adjusting chamber 12. Similarly, an orifice Ba is formed between the water supply port B and the pressure-adjusting chamber 13. Annular spaces Ca and Cb in communication with the water delivery port C are formed around valve seats Ab and Bb, respectively. Preferably, these spaces are connected with the delivery port C to prevent the liquid discharged into the spaces Ca and Cb from remaining.

Figure 31A:
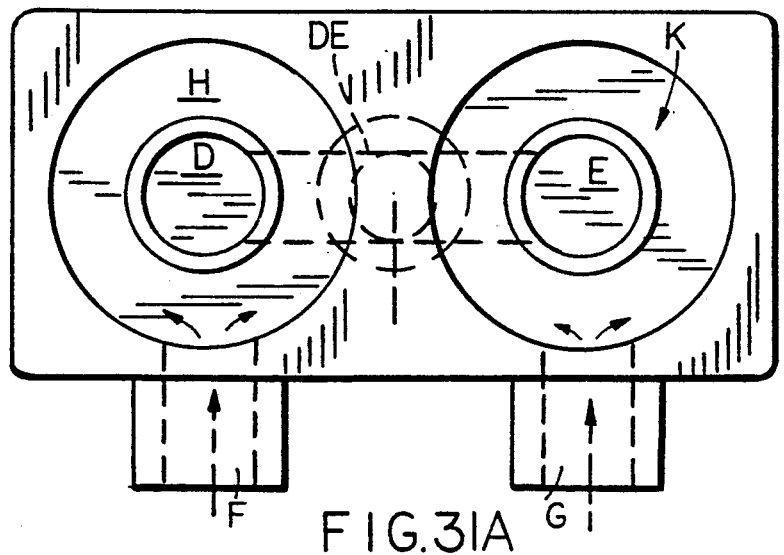
FIG. 31(a) is a rear view of the body of a further valve to which the invention is applied.
Figure 31B:
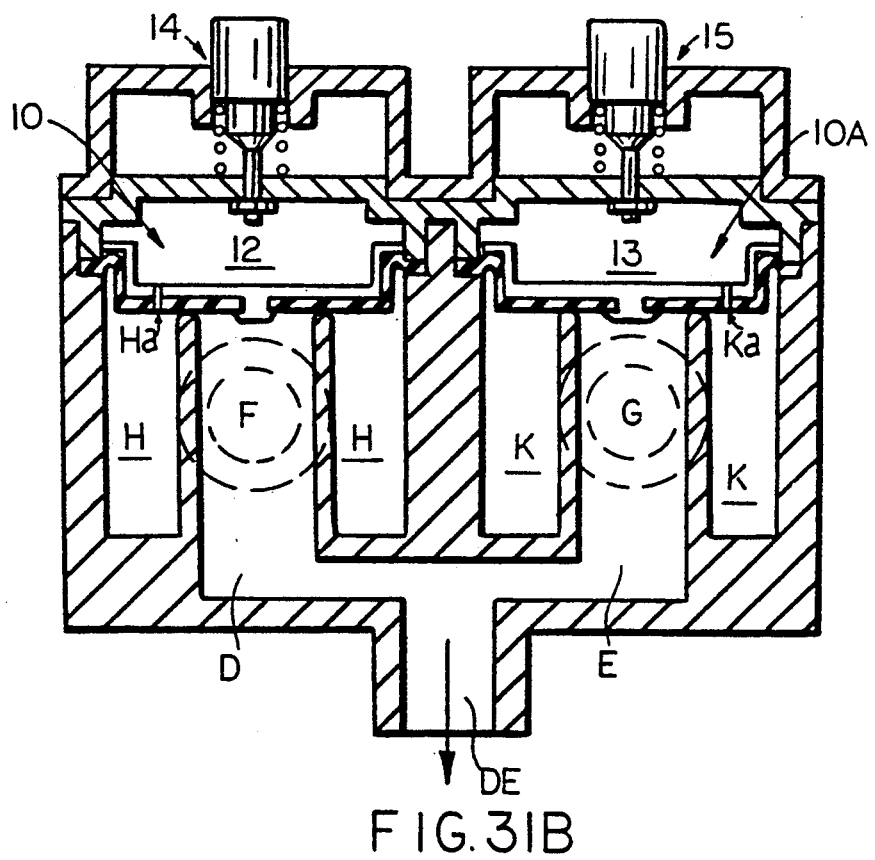
FIG. 31(b) is a cross-sectional view of the body shown in FIG. 31(a)

FIG. 31 shows an example of valve mechanism in which liquid supplied from plural liquid supply ports is delivered from a single delivery port. Annular spaces H and K communicating with water supply ports F and G, respectively, are formed around delivery portions D and E, respectively. The liquid supply portions F and G merge inside the valve body and are connected as a single delivery port DE with the outside. An orifice Ha is formed between the pressure-adjusting chamber 12 and the space H. Likewise, an orifice Ka is formed between the pressure-adjusting chamber 13 and the space K.

The valve mechanisms shown in FIGS. 30 and 31 are convenient to mix plural kinds of liquid at a given ratio, the plural kinds of liquids being supplied from tanks storing them. The present invention can also be applied to this structure of valve mechanism.

FIG. 32 shows an example in which the windup shaft 20 is rotated via the operation lever 51. The operation lever may also be attached directly to the windup shaft 20 whose rotation is limited. This lever may be manually operated to store energy in the spring.

In the illustrated embodiments, the first lever 34 and the second lever 36 are mounted between the cams 23 and 24 and the pilot valve mechanisms 14 and 15, respectively. Utilizing their leverages, the valves can be opened and closed with a relatively small torque of the torsion coil spring 21. Where a spring which produces a large torque when it is released is used, the cams can directly actuate the valves or pilot valves. Instead of the torsion coil spring 21 acting as a driver or power source, a spiral spring or other spring may also be used.

Also in the illustrated embodiments, the two cams 23 and 24 are used. If the axial dimension permits, plural cam surfaces may be made to overlap each other axially. The two cams 23 and 24 may be made to overlap each other on the same axis. Furthermore, the speed-adjusting means 22 can take a form other than an eddy-current governor mechanism. A speed-adjusting means making use of air resistance or frictional resistance may also be employed.

As described thus far, in accordance with the present invention, periods of time can be set, using a manually wound up spring as a driver. Therefore, a small-sized, inexpensive valve control timer unit which can operate stably even in the event of a power failure or other unforeseen situation can be offered. Since the spring is used as a power source, a unit having long life can be manufactured.

While the foregoing description and drawings represent the preferred embodiments of the present invention, it will be obvious to those skilled in the art that various changes and modifications may be made therein without departing from the true spirit and scope of the present invention.

What is claimed is:

1. A timer unit for switching the operation times of plural valve mechanisms which open and close fluid passages, comprising:
   a windup shaft mounted so as to be rotatable;
   a spring which, when said windup shaft is rotated through a given angle, is wound and tightened so that energy is stored in the spring;
   speed-adjusting means which adjusts the rotation of the windup shaft when the tightened spring is released, said speed-adjusting means being an eddy-current-generator governor mechanism comprising a metal sheet rotated by rotation of the windup shaft, a pair of magnets disposed on opposite sides of the metal shaft, and a pair of yokes disposed on opposite sides of the metal sheet; and
   a plurality of cams to which rotation of the windup shaft driven by the releasing force of the spring is imparted so as to rotate the cams, said cams having profiles corresponding to operation times of the valve mechanisms.

2. The timer unit of claim 1, wherein a lever is mounted between each cam and the corresponding one of said valve mechanisms.

3. The timer unit of claim 1, wherein each of said valve mechanisms comprises a valve body having a fluid passage, a main valve capable of opening and closing the fluid passage, and a pilot valve mechanism for bringing the main valve either into its delivery position where the main valve permits communication of the fluid passage or into its cutoff position where the main valve cuts off the fluid passage, and wherein the cams activate their respective pilot valve mechanisms.

* * * * *